(12) United States Patent
Hua

(10) Patent No.: US 7,032,857 B2
(45) Date of Patent: Apr. 25, 2006

(54) MULTI-SENSOR GUIDANCE SYSTEM FOR EXTREME FORCE LAUNCH SHOCK APPLICATIONS

(76) Inventor: Cuong Tu Hua, 44360 Sioux Ter., Fremont, CA (US) 94539

( * ) Notice: Subject to any disclaimer, the term of this patent is extended or adjusted under 35 U.S.C. 154(b) by 107 days.

(21) Appl. No.: 10/644,616

(22) Filed: Aug. 19, 2003

(65) Prior Publication Data

US 2005/0040280 A1    Feb. 24, 2005

(51) Int. Cl.
*F41G 7/00* (2006.01)
*F42B 15/01* (2006.01)

(52) U.S. Cl. ............... 244/3.15; 244/3.1; 244/3.16; 244/3.17; 244/3.18; 701/200; 701/207; 701/213; 701/222

(58) Field of Classification Search ......... 244/3.1–3.3; 342/61–65, 450–465, 175, 195, 161, 357.01–357.17; 701/200, 207–223
See application file for complete search history.

(56) References Cited

U.S. PATENT DOCUMENTS

| | | | | |
|---|---|---|---|---|
| 3,795,911 | A | | 3/1974 | Hammack |
| 4,589,610 | A | * | 5/1986 | Schmidt ................. 244/3.19 |
| 4,700,307 | A | * | 10/1987 | Mons et al. ............. 701/220 |
| 4,783,744 | A | * | 11/1988 | Yueh ..................... 701/221 |
| 5,225,838 | A | * | 7/1993 | Kanter et al. ............ 342/61 |
| 5,260,709 | A | * | 11/1993 | Nowakowski ............ 342/62 |
| 5,272,639 | A | * | 12/1993 | McGuffin ............... 701/207 |
| 5,429,322 | A | * | 7/1995 | Waymeyer .............. 244/3.15 |
| 5,479,360 | A | * | 12/1995 | Seif et al. ............... 342/161 |
| 5,631,653 | A | * | 5/1997 | Reedy ................... 342/62 |
| 5,755,400 | A | * | 5/1998 | Kalms, III .............. 244/3.17 |
| 5,862,496 | A | | 1/1999 | Biven |
| 5,886,257 | A | | 3/1999 | Gustafson et al. |
| 6,064,332 | A | * | 5/2000 | Cloutier ................. 342/62 |
| 6,244,536 | B1 | * | 6/2001 | Cloutier ................. 244/3.19 |
| H1980 | H | * | 8/2001 | Cloutier ................. 342/62 |
| 6,279,851 | B1 | * | 8/2001 | Huss et al. .............. 244/3.15 |
| 6,456,906 | B1 | | 9/2002 | Hua |
| 6,512,976 | B1 | * | 1/2003 | Sabatino et al. ........ 701/207 |
| 6,845,938 | B1 | * | 1/2005 | Muravez ................ 244/3.11 |
| 6,859,727 | B1 | * | 2/2005 | Bye et al. .............. 701/210 |

OTHER PUBLICATIONS

Cuong Tu Hua, "Investigation of Methods for Adaptive Path Control of Surface Ships," Ph.D. Dissertation, University of Michigan, Jan. 1980.

* cited by examiner

*Primary Examiner*—Bernarr E. Gregory
(74) *Attorney, Agent, or Firm*—Lee, Hong, Degerman, Kang & Schmadeka

(57) ABSTRACT

A projectile navigation system operable within an extremely high G-shock loading environment during the launch phase may include a set of Kalman filters configured to repeatedly calculate a navigational solution by solving a set of non-linear equations of motions of the projectile utilizing a current parameter vector, position, velocity, and attitude of the projectile. The system may include a suite of solid state sensors to calibrate the Kalman filter equations. If desired, the system may also include a satellite based positioning-determining (SBPD) attitude determination system configured to update the state of the host projectile by making real time attitude measurements of the projectile, and a parameter estimator configured to estimate and update a parameter vector of the host projectile. An external guidance and control processor may be used to generate guidance and control signals, enabling real time navigation of the host projectile.

58 Claims, 12 Drawing Sheets

MULTI-SENSOR GUIDANCE SYSTEM FOR EXTREME FORCE LAUNCH SHOCK APPLICATIONS

BACKGROUND OF THE INVENTION

1. Field of the Invention

The present invention relates generally to a guidance system, and in particular to a solid state guidance system configurable with a host projectile and operable within an extreme force launch shock environment.

2. Description of the Related Art

Currently available navigation, guidance, and control (NG&C) systems for projectiles, missiles, and space vehicles, that operate in benign flight environments, typically include GPS-based guidance systems combined with an inertial navigation system (INS). Typical INS systems include an inertial measurement unit (IMU) designed to measure motions of a host vehicle. In many systems, the IMU unit measures the swing of the proof masses of its accelerometers to infer translational accelerations of the host vehicle. Similarly, the IMU unit measures the movement of its spinning gyroscopes about their respective axes to calculate rotational rates.

The accuracy of IMU-derived data is therefore reliant upon the accuracy of its inertial sensors. However, in some applications such as non-thrusted projectiles, the accelerations are extremely high (approximately 15,000 Gs–20,000 Gs). Not surprisingly, the inertial sensors of the IMU system (swinging proof masses and spinning gyroscopes) are susceptible to failure. To improve the reliability of these systems, the design of IMU system components undergo a process known as G-hardening, which is an extremely expensive process. However, even after the IMU components have undergone a G-hardening process, these components are susceptible to failure when subjected to extreme G-forces. While there have been attempts to design durable and reliable guidance systems that may be configured with thrusted and non-thrusted flight vehicles, these attempts have not been entirely successful.

SUMMARY OF THE INVENTION

A projectile navigation system operable within an extremely high G-shock loading environment during the launch phase may include a set of Kalman filter equations configured to repeatedly calculate a navigational solution by solving a set of non-linear equations of motions of the projectile utilizing a current parameter vector, position, velocity, and attitude of the projectile. The system may include a suite of solid state sensors to calibrate the Kalman filter equations. If desired, the system may also include a satellite based positioning-determining (SBPD) attitude determination system configured to update the state of the host projectile by making real time attitude measurements of the projectile, and a parameter estimator configured to estimate and update a parameter vector of the host projectile. An external guidance and control processor may be used to generate guidance and control signals, enabling real time navigation of the host projectile.

BRIEF DESCRIPTION OF THE DRAWING

The above and other aspects, features and advantages of the present invention will become more apparent upon consideration of the following description of preferred embodiments taken in conjunction with the accompanying drawing, wherein.

DETAILED DESCRIPTION OF THE PREFERRED EMBODIMENTS

Figure 1:
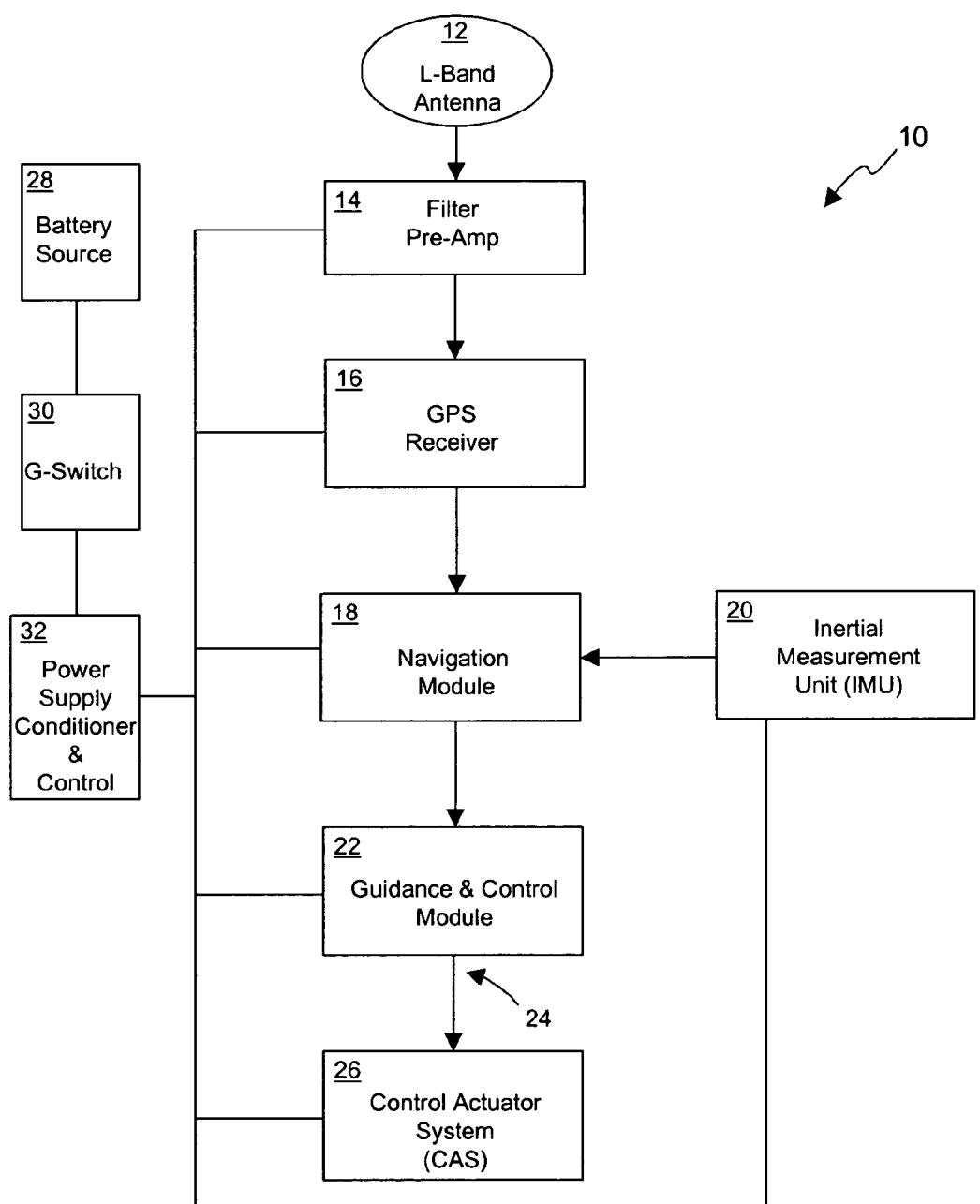
FIG. 1 is a block diagram depicting a conventional GPS-based guidance system.

In the following description of the preferred embodiments, reference is made to the accompanying drawing, which form a part hereof, and which show by way of illustration, specific embodiments of the invention. It is to be understood by those of ordinary skill in this technological field that other embodiments may be utilized, and structural, electrical, as well as procedural changes may be made without departing from the scope of the present invention.

First of all, in many embodiments, the present invention may be implemented as a NG&C system for thrusted and non-thrusted flight vehicles and projectiles. As will be described herein, the ballistic trajectory of a projectile is very well defined, and the body motion of the projectile itself may be used as an inertial sensor implemented in software using, for instance, an adaptive Kalman filter. As will be described in detain herein, many embodiments of the present invention provide a NG&C system that is operable without an IMU. As such, the present invention does not rely upon the fragile instrumentation typically found in conventional IMUs, such as accelerometers and gyroscopes, which rely upon the motions of their sensing elements to measure incremental changes in velocities and rotation angles of the host projectile.

In operation, an adaptive Kalman filter utilizes SSNA sensor output signals during flight to provide corrections to initial conditions of a ballistic trajectory, as well as to update drag and other aerodynamic derivatives of the projectile. If a SSNA measurement is available during a maneuver, the Kalman filter may use it to update its navigation solution along with other coefficients.

It is universally accepted that the SBPD sensor provides the most accurate navigation measurements among all SSNA used in projectile NG&C systems. However, recent conflicts have demonstrated that the SBPD sensor is extremely vulnerable to relatively inexpensive and easily obtainable jammers. Even though the United State Department of Defense has expended considerable time and resources in R&D efforts in the area of GPS anti-jamming technology, navigational systems that only implement SBPD sensors have limitations on their field of use. Another drawback of the SBPD sensors is that they often experience decreased functionality when operating near the North or South Poles.

As a matter of convenience, the terms "static sensors" and "solid state sensors" will be used herein to denote sensors operable without relying upon moving parts. These static or solid state sensors can be implemented instead of, or in conjunction with, a SBPD sensor system. In this case, the sensor outputs can be used to aid the adaptive Kalman filter in tracking position, velocity, and attitude of the host projectile. Thus, a navigational system in accordance with the present invention may be implemented without conventional IMU hardware. This is particularly noteworthy since the cost of a G-hardened IMU (for example, about 25,000 Gs in a 155-mm artillery shell) is substantial as compared to the relatively inexpensive process of G-hardening static sensor hardware.

FIG. 1 is a block diagram depicting a conventional GPS-based guidance system 10 which may be integrated or configured with a host projectile operating in a benign flight environment, that may be characterized by the maximum level of shock and vibration loads in the neighborhood of 150 G, for example. As shown, an L-band antenna 12 detects positioning signals, which may be communicated to an associated filter pre-amp 14. The typically weak positioning signals may be amplified to a suitable level and communicated to GPS receiver 16. The GPS receiver may calculate the position and velocity of the projectile using known techniques, and communicate this data to navigation module 18. Navigation module 18 is shown receiving data from two sources; namely, GPS receiver 16 and inertial measurement unit (IMU) 20. The navigation module is often implemented as a simple nine-state Kalman filter, while a typical IMU 20 includes one or more gyroscopes and one or more accelerometers.

In operation, IMU 20 measures the movement of its spinning gyroscopes about their respective axes, and then calculates the rotational rates and the swing of its accelerometers' proof masses to infer accelerations. Likewise, at predetermined intervals, GPS receiver 16 provides position and velocity measurements at what is often referred to as a "medium clock rate." This medium clock rate defines the frequency that the particular GPS receiver can obtain position fixes of the host projectile. A medium rate is typically about 10 Hz.

Navigation module 18 performs a data fusion process after receiving data from GPS receiver 16 and IMU 20. This data fusion process analyzes this data to update and verify position and velocity of the host projectile. An example of a suitable data fusion process providing navigational filtering is described in a reference entitled "Introduction to Random Signal and Applied Kalman Filtering," by R. Grover Brown and Patrick Y C. Hwang, published by John Wiley & Sons, Inc. (1992).

Guidance and control module 22 may generate control signal 24 utilizing, for example, a suitable guidance algorithm. One such guidance algorithm is known as proportional navigation guidance law. This guidance algorithm is disclosed in "Advanced Navigation, Guidance and Control, and their Applications," Chapter 6, by Ching-Fang Line, published by Prentice Hall Series (1991).

In general, control signals generated by control module 22 are communicated to a control actuator system (CAS) 26, which responsively provides projectile steering by manipulating or controlling the appropriate guidance devices of the host projectile. Power necessary for system operation may be obtained from battery source 28.

System start-up or initialization is typically triggered using an appropriate device such as gravitational switch 30 (G-switch). The G-switch typically includes a device that is responsive to a particular gravitational threshold (for example, 1,000 g–20,000 g). The detection of a particular, pre-determined, gravitational threshold by the G-switch may be used to indicate a launching or deployment of the projectile.

The system may be further configured with power supply conditioner and control 32. This control unit may be used to control and deliver the necessary power to the appropriate on-board systems such as filter pre-amp 14, GPS receiver 16, and IMU 20 to name a few. Control unit 32 is typically necessary since these on-board systems have varying power requirements.

Many embodiments of the invention will now be described in the context of a guidance and control system configured with a host projectile, and which is operational with various satellite based positioning-determining navigation systems. Particular reference will be made to several such navigation systems including, for example, the global positioning system (GPS), global orbiting navigation system (GLONASS), and the Galileo navigation system. However, it is to be understood that no particular navigation system environment is critical to the invention. As a matter of convenience, the term "satellite based positioning-determining (SBPD) system" will be used herein to collectively refer to GPS, GLONASS, Galileo and other similar or compatible satellite based positioning-determining systems that provide information by which an observer's position and the time of observation can be determined.

To provide operational context of projectile guidance and control systems that may be implemented in accordance with the invention, aspects of particular SBPD systems will now be described. The Global Positioning System (GPS) is a system of satellite signal transmitters that transmits information from which an observer's present location and/or the time of observation can be determined. GPS was developed by the United States Department of Defense under its NAVSTAR satellite program. A fully operational GPS includes more than 24 Earth orbiting satellites deployed in approximate uniform fashion around six circular orbits having four satellites per orbit. In the GPS system, the orbits are inclined at an angle of about 55° relative to the equator and are separated from each other by multiples of 60° longitude. The orbits have radii of about 26,560 kilometers and are approximately circular. The orbits are non-geosynchronous, with 0.5 sidereal day (11.967 hours) orbital time intervals, so that the satellites move with time relative to the Earth below. Generally, four or more GPS satellites are visible at any given time, thus permitting the calculation of an observer's position most anywhere on the Earth's surface.

Each satellite within the GPS system typically includes a cesium or rubidium atomic clock providing timing information for signals transmitted by the associated satellite. Each satellite may also provide internal clock correction for each satellite clock.

Conventional GPS satellites transmit continuous, or substantially continuous, L-band carrier signals. These carrier signals comprise two spread spectrum, L-band carrier signals; specifically, an $L_1$ signal having a frequency $f_1$=1575.42 MHz (nineteen centimeter carrier wavelength), and an $L_2$ signal having a frequency $f_2$=1227.6 MHz (twenty-four centimeter carrier wavelength). Each of these two frequencies $f_1$ and $f_2$ is an integral multiplier ($f_1$=1,540 $f_0$ and $f_2$=1,200 $f_0$) of a base frequency $f_0$=1.023 MHz.

The L1 signal from each satellite may be binary phase shift key (BPSK) modulated by two pseudo-random noise (PRN) codes in phase quadrature, designated as the C/A-code and P-code. In contrast, the $L_2$ signal is BPSK modulated using only the P-code. Characteristics of these PRN codes will now be described.

PRN codes enable the use of a plurality of GPS satellite signals for determining an observer's position and for providing navigation information. A signal transmitted by a particular GPS satellite may be selected by generating, matching, or corrleating the PRN code for a particular satellite. Typically, some or all of the PRN codes are known and may be generated or stored in GPS satellite signal receivers operated by users.

A first known PRN code for each GPS satellite, sometimes referred to as a precision code or P-code, is a relatively long, fine-grained code having, for example, an associated clock or chip rate of $f_0$=10.23 MHz. A second known PRN code for each GPS satellite, sometimes referred to as a coarse acquisition code or C/A-code, is intended to facilitate rapid satellite signal acquisition and hand-over to the P-code. Typically, this second PRN code is a relatively short, coarser-grained code having a clock or chip rate of $f_0$=1.023 MHz.

The C/A-code for most any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office. A typical GPS satellite bit stream includes navigational information on the ephemeris of the transmitting GPS satellite (which includes orbital information about the transmitting satellite within several hours of transmission), and an almanac for all GPS satellites (which includes a less detailed orbital information about all satellites). Transmitted satellite information may also include parameters providing corrections for ionospheric signal propagation delays (suitable for single frequency receivers), and for calculating or determining an offset time between satellite clock time and true GPS time. The navigational information is typically transmitted at a rate of about 50 Baud.

Another satellite based position-determining system is the GLONASS system. As described in the following paragraphs, the GLONASS system can operate independently of other SBPD systems. However, it is to be understood that a satellite-based navigation system of the invention can be implemented to cooperate with a single system such as GLONASS, or in conjunction with one or more SBPD systems such as GPS or Galileo.

The GLONASS system was originally implemented by the former Soviet Union and is now maintained by the Russian Republic. GLONASS uses 24 satellites distributed in approximate uniform fashion in three orbital planes with eight satellites comprising each of the three planes. Each orbital plane has a nominal inclination of about 64.8° relative to the equator, and the three orbital planes are separated from each other by multiples of about 120° longitude. The GLONASS satellites have circular orbits with radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days.

The GLONASS system typically includes two carrier signals, $L_1$ and $L_2$, having respective frequencies of $f_1$= (1.602+9 k/16) GHz and $f_2$=(1.246+7 k/16) GHz. The variable "k" representing the channel or satellite number (k=1, 2 . . . 24). These frequencies lie in two bands at 1.597–1.617 GHz ($L_1$) and 1,240–1,260 GHz ($L_2$). The L1 signal is typically modulated by a C/A-code (chip rate=0.511 MHz) and by a P-code (chip rate=5.11 MHz). The $L_2$ signal is presently modulated only by the P-code. Similar to the GPS satellites, the GLONASS satellites also transmit navigational data at a rate of 50 Baud. The P-code and the C/A-code are typically the same for each satellite, but this is not problematic since the channel frequencies are distinguishable from each other. The methods for receiving and demodulating the GLONASS signals are similar to the methods used for the GPS signals.

A typical SBPD system, such as the GPS and GLONASS systems, transmit coded radio signals (as described above) from a plurality of Earth-orbiting satellites. An typical SBPD antenna receives SBPD signals from a plurality (preferably four or more) of SBPD satellites and passes these signals to an SBPD signal receiver/processor, which: (1) identifies the SBPD satellite source for each SBPD signal; (2) determines the time at which each identified SBPD signal arrives at the antenna; and (3) determines the present location of the SBPD satellites.

The range ($r_i$) between the location of the i-th SBPD satellite and the SBPD receiver is equal to the speed of light c multiplied by $\Delta t_1$, wherein $\Delta t_1$ is the time difference between the SBPD receiver's clock and the time indicated by the satellite when it transmitted the relevant phase. However, a typical SBPD receiver has an inexpensive quartz clock, which is not synchronized with respect to the more stable and precise atomic clocks, implemented by the satellites. Consequently, the SBPD receiver estimates a pseudo-range (pr) (not a true range) to each satellite.

After the SBPD receiver determines the coordinates of the i-th SBPD satellite by demodulating the transmitted ephemeris parameters, the SBPD receiver can obtain the solution of the set of the simultaneous equations for its unknown coordinates ($x_o$, $y_o$, $z_o$) and for unknown time bias error (cb). The SBPD receiver can also determine velocity of a moving platform.

Therefore, currently available NG&C systems, such as those shown in FIG. 1, are limited to applications where the maximum level of operating shock and vibrations specifications are in the neighborhood of 150 Gs. For convenience, the flight environments having maximum operating shock and vibration levels in the neighborhood of 150 Gs will also be referred to herein as a "benign" environment.

Figure 2:
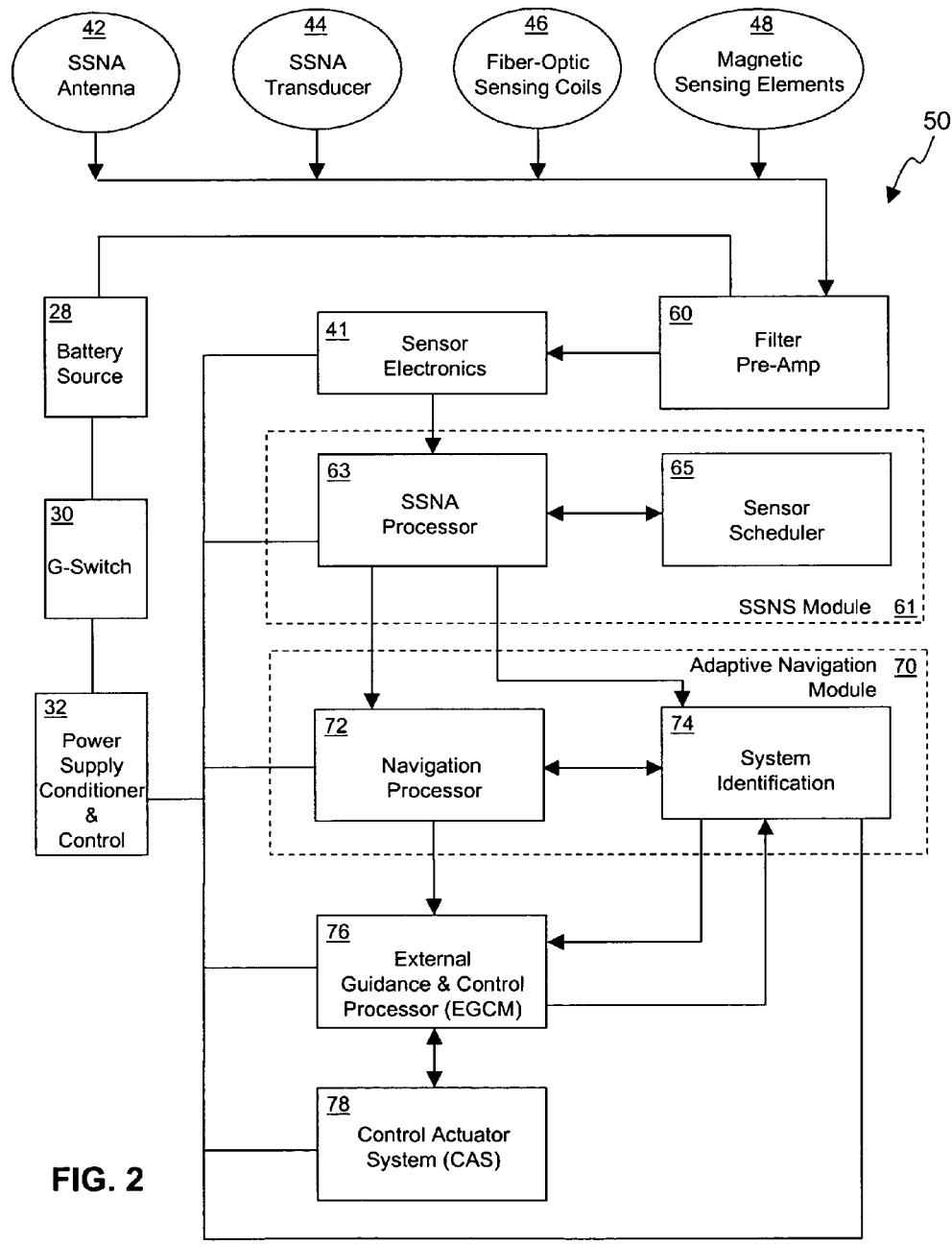
FIG. 2 is a block diagram showing one embodiment of a NG&C system using multiple SSNA sensors in accordance with the present invention.

FIG. 2 is a block diagram showing a navigation, guidance, and control (NG&C) system 50 in accordance with some embodiments of present invention. A notable distinction between NG&C system 50 (FIG. 2) and a conventional system 10 (FIG. 1) is that NG&C system 50 does not require an IMU 20 since the host projectile itself serves as an inertial sensor. As will be described in detail herein, the function of an IMU may be simulated in software using, for example, adaptive navigation processor 70.

The term "host projectile" and "projectile" will be used herein to denote projectiles that may be configured with a navigation and guidance system in accordance with the invention. It is to be understood that the term "projectile" includes thrusted as well as non-thrusted flight vehicles. Examples of thrusted vehicles include missiles, rocket-propelled grenades (RPGs), multiple launch rocket system with terminally guided warhead (MLRS TGW), shoulder-launched closed range guided missiles, and the like. Examples of non-thrusted flight vehicles include air or ground launched munitions, artillery shells, mortar rounds, smart tank rounds for tank main guns, satellite-guided smart bombs, smart munitions, terminally-guided submunitions, among others.

NG&C 50 is shown generally including a series of one or more static sensors. Their measurements may be used as navigation aids for calibrating adaptive navigation module 70. Particular references will be made to various static sensors including, for example, SBPD systems, fiber-optic gyroscopes (FOG), barometric altimeters, magnetic sensors, various types of optical sensors, sun sensors, star sensors, ground-based tracking radar, and the like. As a matter of convenience, the term "solid-state navigation aiding" (SSNA) sensors will be used herein to collectively refer to these static sensors.

Referring still to FIG. 2, the NG&C module 50 is shown having a number of sensing elements for SSNA sensors. In particular, NG&C 50 may include one or more of SSNA antennas 42, SSNA transducer 44, one or more multi-turn fiber-optic sensing coils 46 for a FOG unit, and magnetic sensing elements 48. In operation, electrical signals generated by each SSNA sensing element may be passed to filter pre-amp 60 to amplify the typically weak sensor signals to a suitable level. The filter pre-amp output may be connected with sensor electronics 41 to provide the necessary input to SSNA processor module 63.

One or more SSNA antennas 42 may be used in conjunction with a network of ground-based tracking radar. Position and velocity information from the tracking network may be communicated to the projectile through antennas 42 at irregular intervals. The sensor scheduler 65 may be used to handle the task of data fusing the set of information with other sensor data.

SSNA transducer 44 may include a barometric pressure transducer to measure the ambient air pressure. After being compensated and calibrated, the SSNA processor 63 may compare the barometric data with its pre-launch reference value (typically on the ground for land-based launch applications) to obtain the altitude of the projectile.

The fiber-optic gyroscope (FOG) is particular implementation of a Sagnac Interferometer that typically includes a multi-turn, fiber-optic sensing coil 46 attached to an interferometer sensor. In operation, a beam from a single optical source is divided into two by a beam splitter. The two resulting beams are then directed through the fiber-optic coil, in opposite directions. According to the theory of relativity, two counter rotating beams propagating about a fiber-optic coil will have different travel times if the interferometer is rotating relative to inertial space. Therefore, the rotation of the assembly will produce Sagnac phase shifts in each beam that have equal magnitudes but opposite signs. The phase differences between those two optical waves at the interferometer output are proportional to the inertial rotation rate.

Magnetic sensing coil 48 may be used to determine the heading angle between the longitudinal axis of the projectile and the magnetic North vector. The SSNA processor 63 uses the value of the angle between the magnetic North vector and the geographic North vector at launch to convert the heading angle into the corresponding value in the projectile navigation reference frame.

Solid-state navigation sensor (SSNS) module 61 may include optional sensor scheduler 65 working in conjunction with the SSNA sensor processor 63. Sensor scheduler 65 is designed to manage the data acquisition process for the SSNS module 61. In a simultaneous update mode, it may have to synchronize all data from a suite of different sensors arriving at different times for navigation aiding. For a NG&C that includes sensors with synchronous and easily acquired measurements, the sensor scheduler may issue a command to acquire measured data according to either a predetermined schedule or the accuracy requirements from the adaptive navigation module 70. For various embodiments that include asynchronous SSNA sensors, such as ground-based tracking radar and the SBPD sensors, the sensor scheduler 65 may synchronize and adjust all other synchronous SSNA measurements stored in temporary buffers with the asynchronous SBPD data. In various embodiments with a serial update mode, sensor scheduler 65 would perform the data acquisition task for each SSNA sensor, one at a time.

SSNA processor 63 may contain a sensor assembly that operates on the signal generated by the sensing elements. Once generated, the SSNA processor may provide navigational measurement data that can be used to calibrate the Kalman filter in the navigation processor 72. For example, in an embodiment that uses a FOG sensor, the SSNA processor may include a digital microprocessor to accumulate the incremental changes in attitude angles ($\Delta\theta$) to measure the angular rates. Operation of the adaptive navigation module 70 and associated systems will be discussed in detail with regard to FIG. 4

Figure 3:
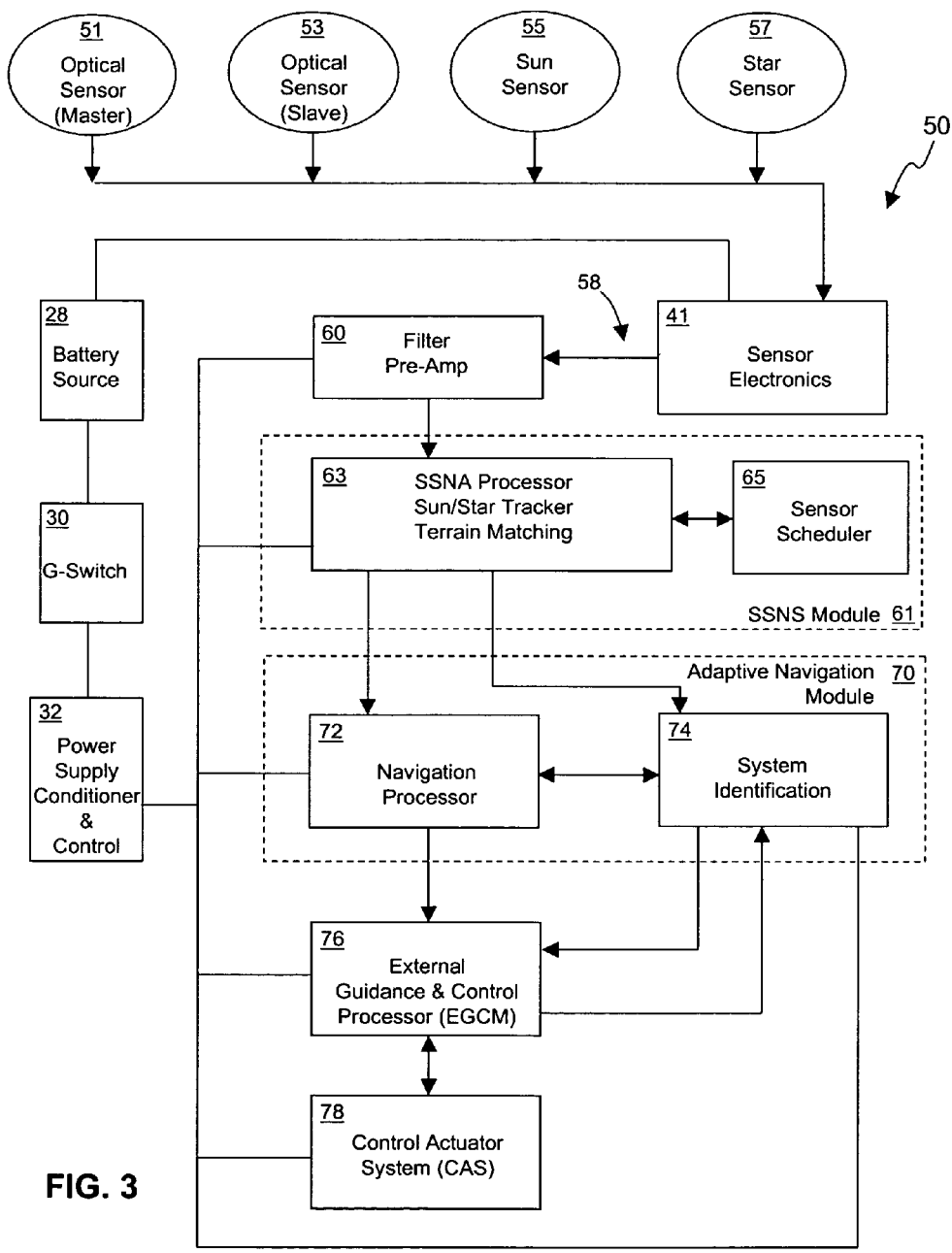
FIG. 3 is a block diagram showing an alternate embodiment of a NG&C system using a number of optical sensors in accordance with the present invention.

FIG. 3 is an example of an embodiment of the present invention that utilizes a number of optical sensors for its SSNA purpose. NG&C 50 is shown generally including a series of different types of optical sensors. In particular, NG&C 50 may include master sensor 51, a number of slave sensors 53, sun sensor 55, and star sensor 57. Output signals received by each of these sensors may be passed through sensor electronics 41, which may be configured to time multiplex these signals, for example, so that they can each be communicated via a single hardware path 58 to filter pre-amp 60. The filter pre-amp amplifies the typically weak positioning signals to a suitable level and communicates these signals to SSNS module 61.

Master optical sensor 51 and optical slave sensors 53 may include an infrared sensor at the nose of the projectile in addition to a number of side-scanned cameras operable within the visible light spectrum. Images from the sensors may be communicated to SSNA processor 63 so that they may be processed by a terrain-matching algorithm to determine the projectile's position with respect to a stored map of geographic features.

Sun sensor 55 unit may be configured with a suitable photodiode array or similar device located in a sunlight trap having an entrance aperture. In flight, the array detects the position of the patch of direct sunlight passing through the entrance aperture. Such position may be used to provide information on the attitude of the projectile relative to the solar disk.

Star sensor 57 may include an electro-optical system allowing a rotating host projectile to detect stars and, therefore, its attitude. For example, during flight stars may pass through one of several slits located in the focal plane of a tiny telescope, where they are detected by a photo-multiplier circuit in the sensor electronics module 41. The output from this sensor is amplified in the filter/pre-amp 60 and converted into TTL logic and fed to the SSNA Processor 63. The processor, using a stored star catalog and an initial attitude estimate, may utilize the star magnitude information to determine which star has been sighted. The time-tagged star data allows determination of the instance when the axis of the star sensor crosses the star, thereby yielding the projectile attitude information. SSNA processor 63 may integrate various pieces of information from some or all of the just-described optical sensors to obtain position, attitude angles, and velocity of the host projectile.

Figure 4:
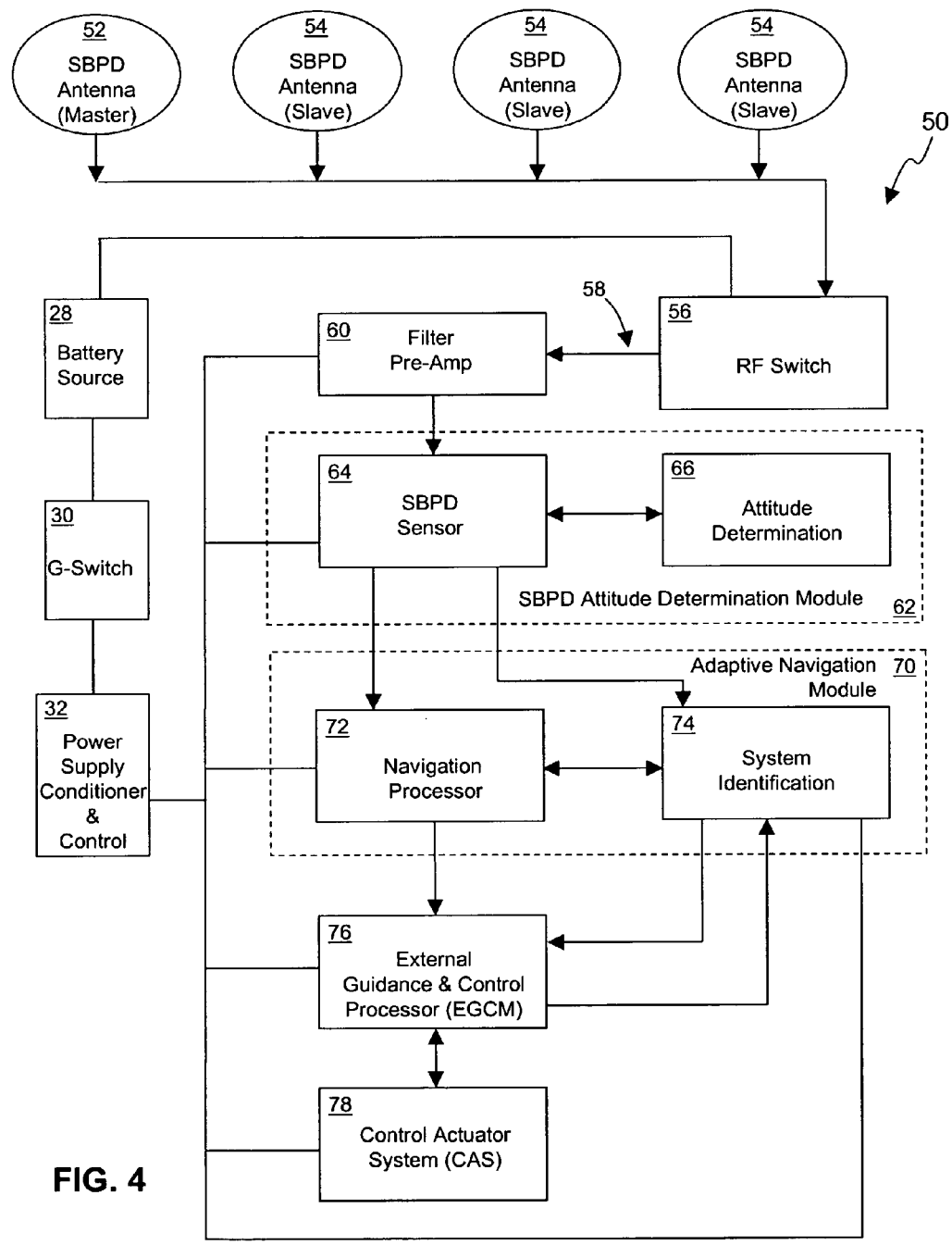
FIG. 4 is a block diagram showing yet another embodiment of a NG&C system using a SBPD sensor arrangement in accordance with the present invention.

An embodiment of the present invention that utilizes the SBPD system will now be described. FIG. 4 shows NG&C 50 generally including a series of SBPD antennas, and in particular, master SBPD antenna 52 and three slave SBPD antennas 54. Positioning signals received by each of the master and slave SBPD antennas may be passed through RF switch 56, which may be configured to time multiplex these signals so that they can each be communicated via a single hardware path 58 to filter pre-amp 60. The filter pre-amp amplifies the typically weak positioning signals to a suitable level and communicates these signals to SBPD attitude determination module 62.

Positioning signals received from master antenna 52 may be used to compute, for example, position, velocity, and time coordinates of the host projectile, whereas signals received by slave antennas 54 may be used to compute carrier phase measurements based upon signals received. Typical implementations include a single master antenna and three slave antennas, but other configurations are possible where greater or fewer antennas may be used. As few as two or three slave antennas may provide a sufficient degree of accuracy. On the other hand, some situations may require increased accuracy or perhaps redundancy and thus additional slave antennas (for example, 5, 10, or more antennas) can be implemented as may be desired or required.

SBPD attitude determination module 62 generally includes SBPD sensor 64 and attitude determination unit 66. The SBPD sensor receives raw data from master and slave antennas 52 and 54, and may be used to generate two primary range values: pseudo range and delta range. The raw data received by the SBPD sensor will also be referred to herein as "antenna signal data."

Upon receiving this range data, SBPD attitude determination unit 66 calculates the attitude of the host projectile and communicates this information to SBPD sensor 64. Accordingly, at this stage of operation, for each satellite in view, five values are known: pseudo range, delta range and three Euler's angles for attitude. For convenience, the pseudo range and delta range data values will also be referred to herein as "range data." The three Euler's angles for attitude, roll, pitch, and heading will be collectively referred to as "attitude."

Attitude determination using the SBPD measurements from multiple antennas may be accomplished using known methods. One such method is presented in a reference entitled "Global Positioning System: Theory and Applications," pages 519–538, edited by Bradford W. Parkinson and James J. Spilker Jr. (second publication in 1996 by the American Institute of Aeronautics and Astronautics (AIAA)).

Figure 11:
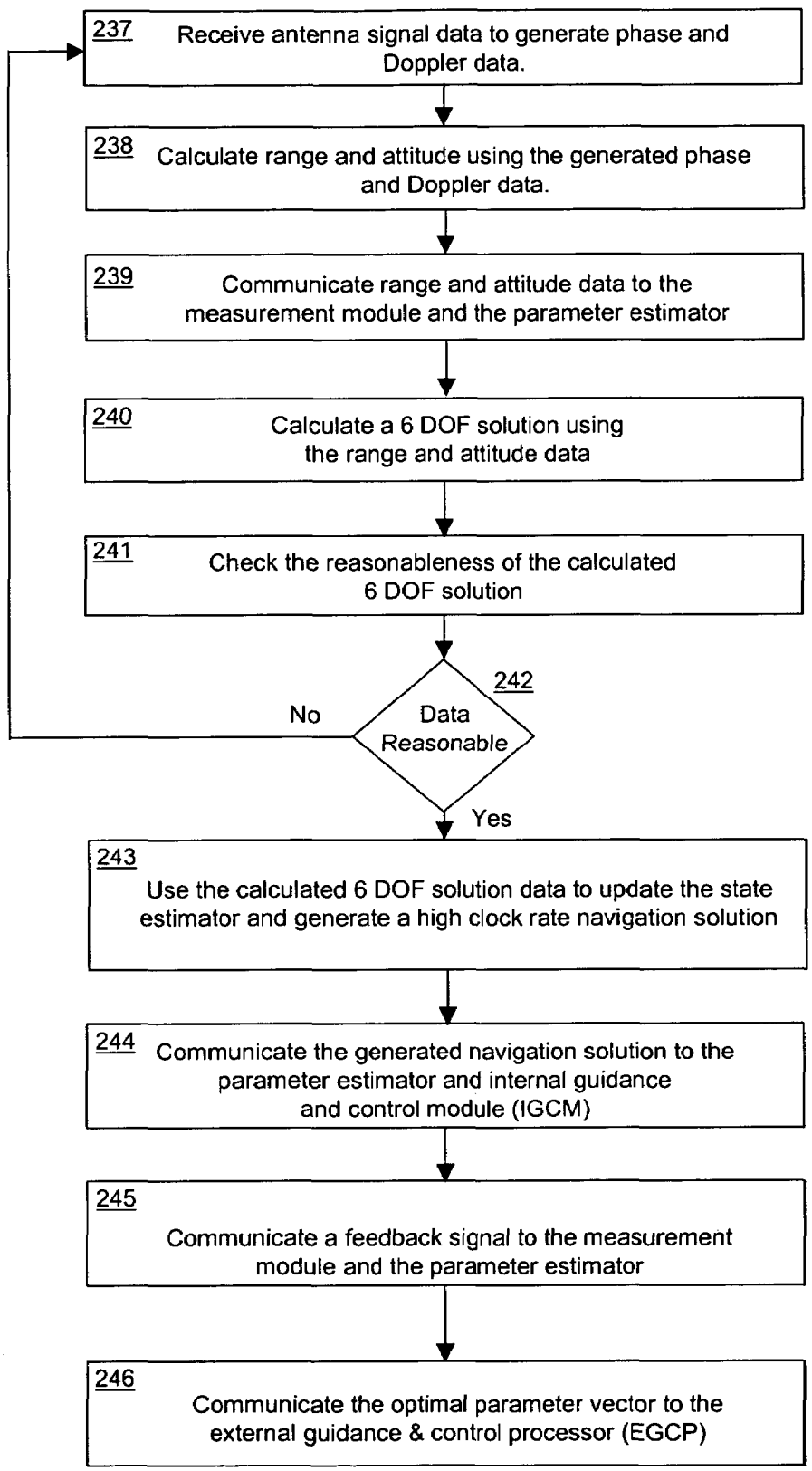
FIG. 11 is a flowchart showing exemplary operations for an adaptive navigation module navigating a thrusted or non-thrusted host projectile using a SBPD attitude determination module in accordance with the invention.
Figure 12:
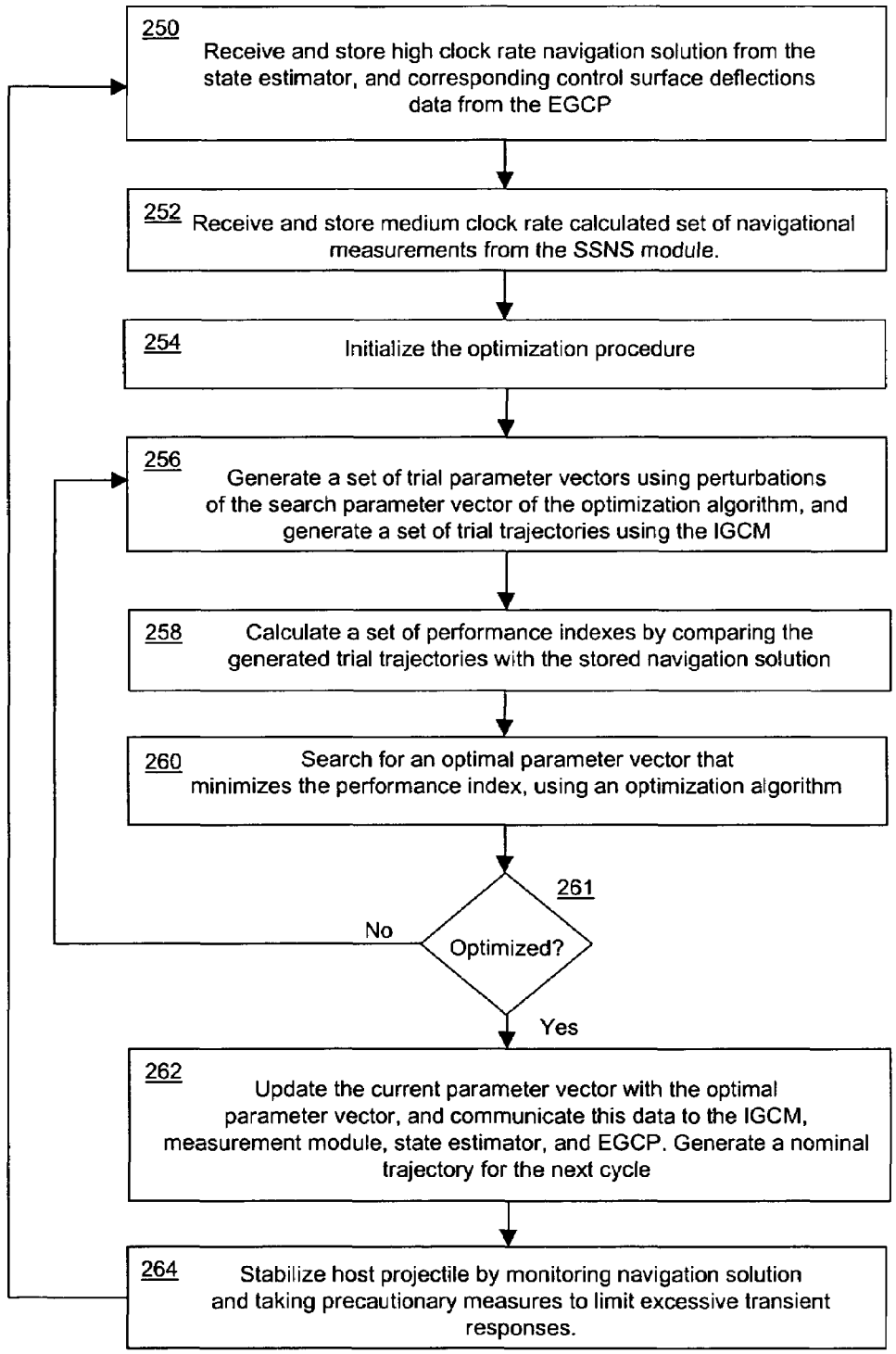
FIG. 12 is a flowchart showing exemplary operations for real time updating of an estimated, host projectile parameter vector in accordance with an embodiment of the invention using an SSNS module.

SBPD attitude determination module 62 may communicate the pseudo range, delta range and attitude data to adaptive navigation module 70. As shown, the adaptive navigation module comprises navigation processor 72 and system identification unit 74. Specific aspects of the navigation processor are shown in FIG. 11, while a more detailed view of the system identification unit is depicted in FIG. 12.

External guidance and control processor (EGCP) 76 may be implemented using most any suitable guidance and control system. EGCP 76 provides three primary functions. First, an impact point can be predicted using the navigation solution provided by a state estimator. Second, the predicted impact point may be compared with the aimpoint provided by internal guidance control module (IGCM) 90. Another function is to calculate the correction velocity required to fly the host projectile to the aimpoint.

When and if corrective action is found to be necessary, EGCP 76 may communicate the necessary control signals to control actuator systems (CAS) 78. The CAS may be adapted to control most any flight control devices configurable with a host projectile. Typical host projectiles include flight control devices such as fins, canards, and wings, among others. In thrusted projectile applications, flight control devices may further include a propulsion system.

Similar to conventional systems, system power may be obtained from any suitable battery source 28 and control system 32, while system start-up or initialization may be triggered using, for example, G-switch 30. The specifics of these systems are not essential to the invention and as such, will not be described in more detail herein.

Figure 5:
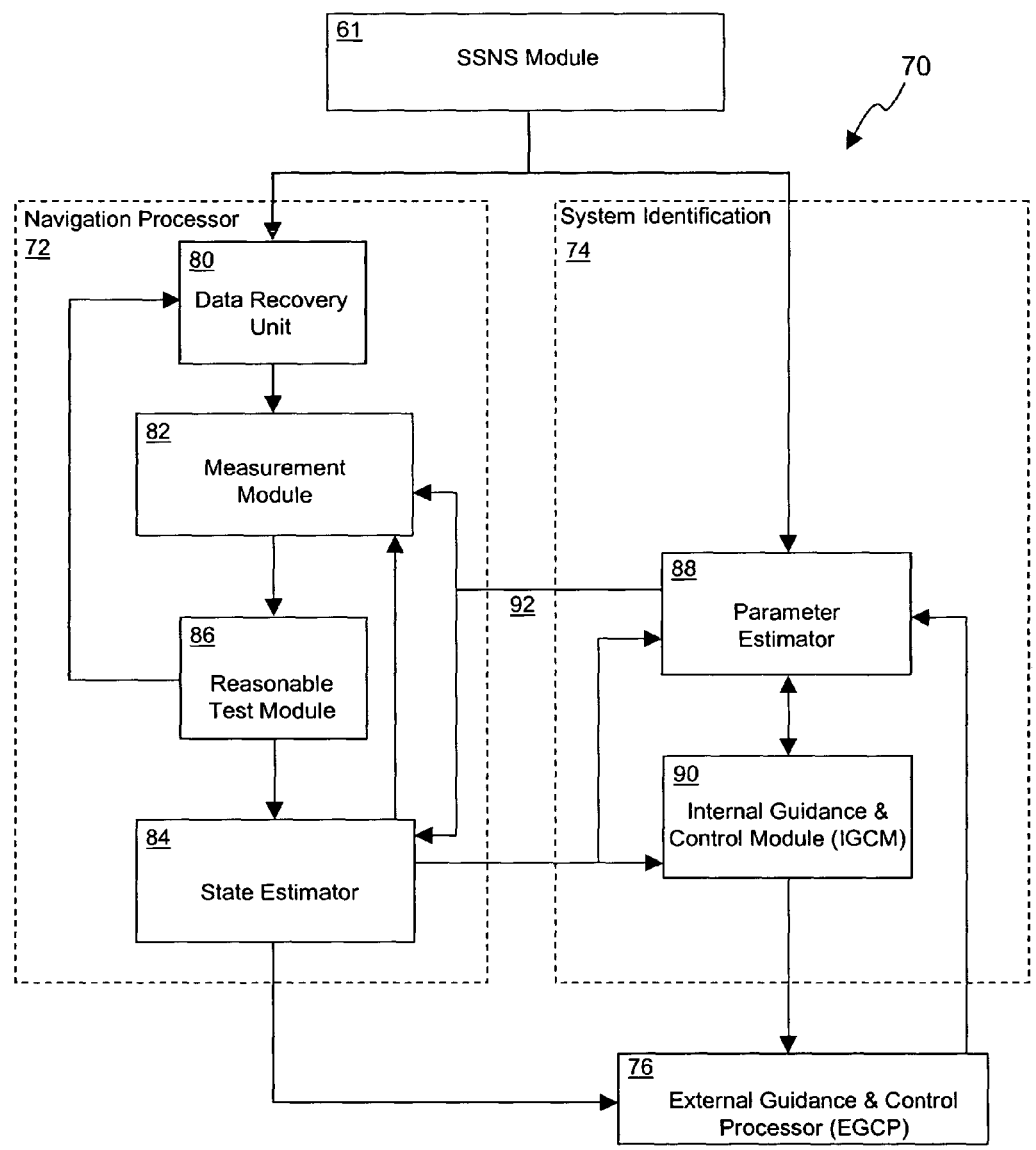
FIG. 5 is a block diagram showing a more detailed view of an adaptive navigation module in accordance with the invention.

FIG. 5 is a block diagram showing a more detailed view of adaptive navigation module 70 in accordance with some embodiments of the invention. Navigation processor 72 is shown generally including an optional data recovery unit 80, measurement module 82, reasonable test module 86, and state estimator 84.

The data recovery unit is typically used to extract as much useful information from the range and attitude data as can be possible. If desired, a measurement error covariance matrix may be modified to reflect the degree of uncertainty in the measuring process. Under typical flight conditions, a data recovery procedure is not necessary since a bad data point can be discarded. In such a situation, navigation processor 72 may continue to operate using the next data point. However, in certain applications where the number of SBPD fixes fall below some predetermined threshold, the data recovery unit may be used in attempt to salvage as much information as possible from what would otherwise be "bad data." One aspect of the navigation processor 72 provides a state or navigation solution of the host projectile by solving a set of non-linear equations of the host projectile formulated as a set of Kalman filter equations.

In operation with a SBPD attitude determination module, for each satellite in view, measurement module 82 receives two sets of data from attitude determination module 62, specifically, range and attitude data. Typically, these data sets are obtained by the measurement module at a medium rate. The measurement module then converts the range and attitude data into a 6 degree-of-freedom solution, which consists of three coordinates of the center of gravity and the attitude of the host projectile. For convenience, the 6 degree-of-freedom solution will also be referred to herein as a "6 DOF solution."

Next, the suitability or reasonableness of the 6 DOF solution may be checked to confirm that it falls within some predefined or expected parameter range (block 86). This operation is often implemented since corrupted or incomplete positioning signals may be received by the system, which could affect system accuracy or stability.

In essence, reasonable test module 86 considers the received range and attitude data to confirm that the data satisfies some accuracy standard. An example may be where the current position of the host projectile is checked relative to where the projectile has been launched. If the received data indicates the current position of the projectile is outside some predetermined threshold (for example, 100 miles from launch origin), then the data received may be identified as "unreasonable" and control may flow back to block 80 so additional data may be obtained. On the other hand, if the current data indicates that the host projectile is within some predetermined threshold, then the data may be deemed "reasonable" and further processing may occur.

State estimator 84 receives the reasonable 6 DOF solution to update and propagate included components, such as a Kalman filter, to obtain a high clock rate navigation solution. Kalman filters are well known in the art. For example, the development of data processing methods for measuring random variables was first suggested by Gauss, who invented the technique of deterministic least-squares. Wiener, using random process theory, developed a procedure for the frequency domain design of statistically optimal filters. Kalman used the optimal recursive filter techniques based on state-space, time domain formulations. This approach is known as Kalman filter, and is very well suited for digital computer implementation. A Kalman filter is a recursive solution to Gauss' original least-squares problem. A recursive solution enables one to do sequential, rather than batch, processing of the measurement data.

State estimator 84 may be implemented using one of several methods providing navigation solution calculations. For example, the state estimator may be configured with a conventional "state estimator," or with more specialized algorithms such as Bayesian state estimators, Kalman filters, and extended Kalman filters.

An optimal state estimator, such as a Bayesian state estimator, is a computational algorithm which utilizes measurements to obtain a minimum error estimate of the state of a system. An optimal estimator algorithm may accomplish this by utilizing knowledge of system and measurement dynamics, assumed statistics of system noises and measurement errors, and initial condition information.

The least-squares (LS) parameter estimation is often considered a special case of the Kalman filter. In an LS implementation of the Kalman filter, measurement noise is considered to be small compared with the system noise. The propagation of the Kalman filter state vector then becomes the LS parameter estimation. The LS solution satisfies the condition that the weighted sum of the squares of the resultant a posteriori residuals is minimum.

In the Kalman filter equations, the total error state represents errors in the navigation process, the parameters in the body dynamics, and the SSNA update process. This is modeled as a set of state vectors for each process. The corresponding dynamical equations are provided as a linearized process. The dynamic equation models the error dynamics through the use of a state dynamics matrix, noise dynamics, and noise terms.

In some implementations, the following Kalman filter states represent the standard navigation error states in inertial frame: position errors, velocity errors, and attitude errors. In other applications, the Kalman filter state vector might include more or less number of states depending on the tradeoff between accuracy and computational load.

Complete Kalman filter formulation is well known in the art and will not be reproduced herein. Body dynamic error states consist of force states ($C_N$-Normal force coefficient, β-Drag coefficient, etc.), moment states ($C_M$-Moment coefficient, etc.), and air density states (air density, air viscosity, etc.)

State estimator 84 may communicate the calculated navigation solution to parameter estimator 88 and internal guidance and control module (IGCM) 90 using, for example, a high clock rate. One purpose of the parameter estimator 88 is to estimate the set of parameters required to predict the trajectory of the host projectile on a continuous or periodic basis. This estimation is generally done at a slow clock rate. The set of parameters for trajectory prediction may be further grouped into two categories: internal and external trajectory parameters. In-flight corrections to an initially predicted trajectory of the host projectile may be accomplished by updating sets of internal and external trajectory parameters of the host projectile. Such in-flight corrections enable necessary trajectory modifications or changes, ensuring accurate projectile placement on an intended target (aimpoint).

The internal and external trajectory parameters of the host projectile may be calculated or estimated using, for example, a weighted least-squares fit operation. The internal trajectory parameters refer to the aerodynamic force and moment coefficients of the projectile and its control surfaces. The external trajectory parameters refer to a set of parameters that characterize the environment that the projectile is flying through. In most cases, internal trajectory parameters include the aerodynamic derivatives; and the external trajectory parameters include the atmosphere such as air density, air viscosity, and air temperature, among others. A parameter vector may be formed by stacking all trajectory parameters on a single column. Thus, the two sets of internal and external trajectory parameters will be collectively referred to herein as "parameter vectors."

To facilitate system updates during flight, parameter estimator 88 may be configured with feedback loop 92, which is connected to measurement module 82 and state estimator 84. For example, whenever the parameter vector of the host projectile changes, a feedback signal 92 may be communicated to the appropriate module of navigation processor 72. This feedback signal is typically communicated at a slow clock rate.

Figure 6:
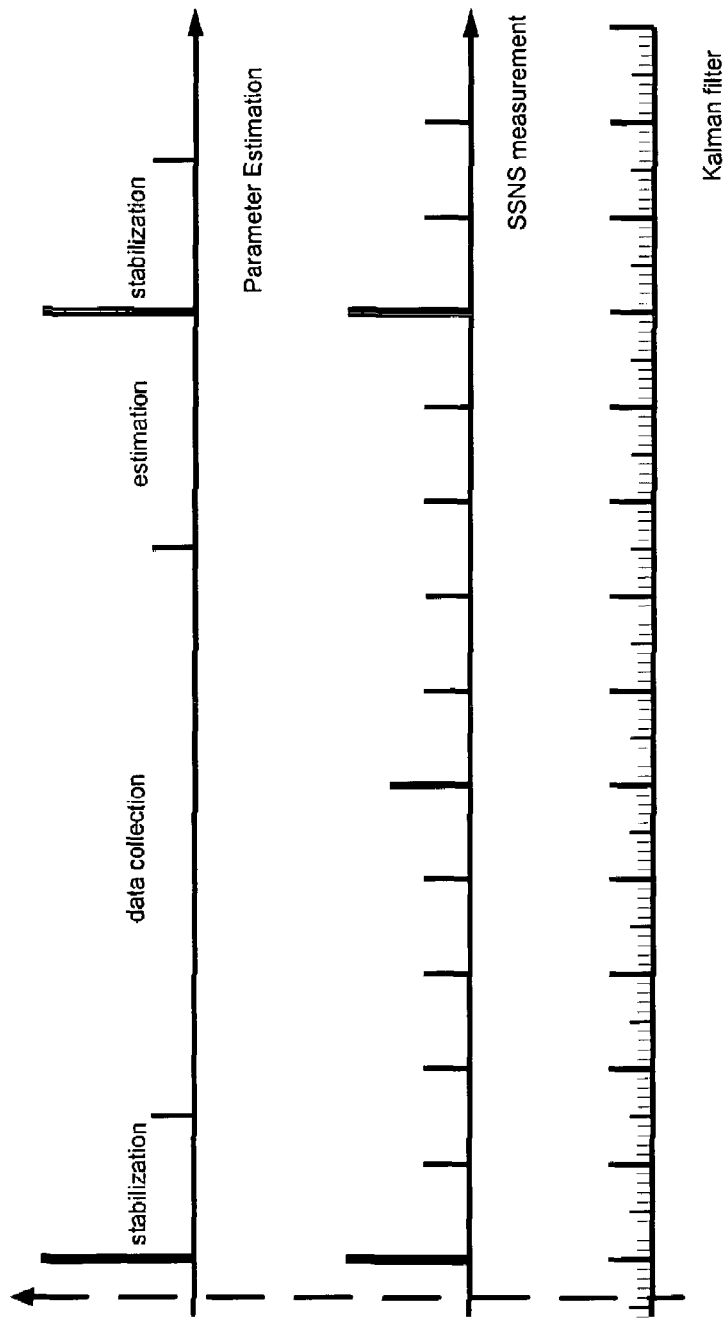
FIG. 6 is a timing diagram showing examples of the relative timing relationship between different clock rates that may be implemented by the various modules of the invention.

FIG. 6 is a timing diagram showing examples of the relative timing relationship between different clock rates that may be implemented by the various modules of the invention. In particular, parameter estimation, SSNS measurement, and Kalman filter clock rates are depicted. The parameter estimation clock rate denotes the timing of parameter estimator 88; the SSNS measurement denotes the timing of SSNS module 61; and the Kalman filter denotes the timing for state estimator 84. As shown in FIG. 6, the parameter estimation cycle consists of three phases: stabilization, data collection, and estimation.

The parameter estimator clock rate is shown being about 10 times slower than the SSNS clock rate which, in turn, is about 10 times slower than the Kalman clock rate. Hence, the slow, medium, and high clock rate terminology used herein to describe the relative relationship between these clock rates. One example may be where the slow clock rate is about 1 Hz, the medium clock rate is about 10 Hz, and the high clock rate is 100 Hz. One reason for implementing a particular module at a slower clock rate is to conserve computational resources. However, it is to be realized that the various clock rates and ratios presented herein are exemplary, and that many embodiments of the invention do not require the implementation of any particular clock rate or clock rate ratio.

The error model for body dynamics can be obtained from wind tunnel tests. The error model for a typical GPS receiver is represented by the following states (receiver pseudo range error, receiver delta range error, receiver's clock g-sensitivity, and the 3-vectors of the GPS antenna offset errors in the body frame). The errors for each GPS satellite (24 states for 4 satellites) are typically represented by the following states (satellite pseudo range error, satellite delta range error, tropospheric model error, and ephemeris errors). Complete equations for GPS receiver states and satellite states are described in the reference entitled "Introduction to Random Signal and Applied Kalman Filtering," authored by R. Grover Brown and Patrick Y. C. Hwang (1992).

Figure 7:
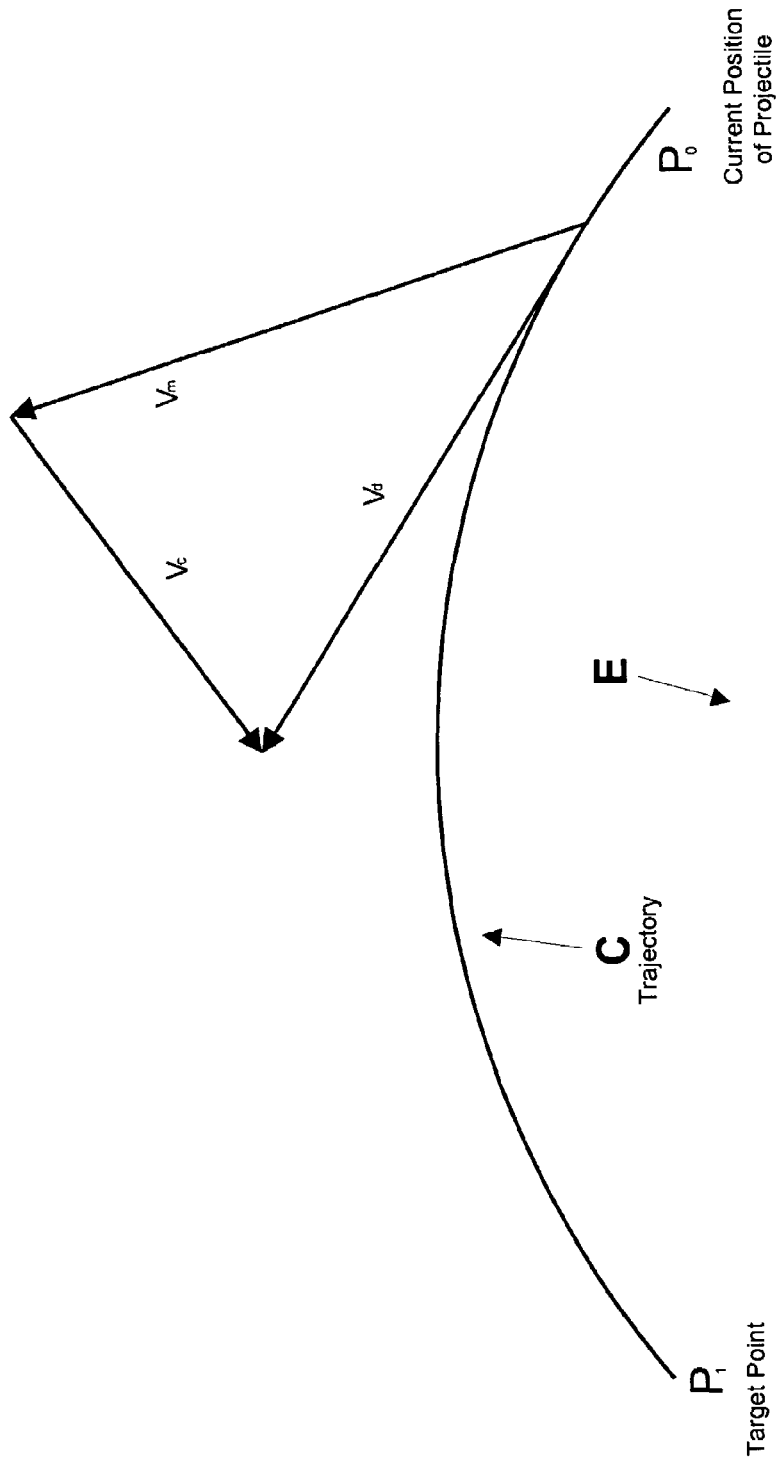
FIG. 7 is a diagram depicting projectile velocity, deficit velocity, and correction velocity of an in-flight host projectile during an instant in time.

FIG. 7 is a diagram depicting projectile velocity, deficit velocity, and correction velocity of an in-flight projectile during an instant in time. A projectile deficit guidance algorithm may be based on the following. At any given instant in time during the flight of a projectile, the projectile (regarded as a particle) is located at a point $P_o$ having $V_m$ in an inertial frame of reference N, in which the projectile's target point $P_1$ and the center E of the (assumed spherically symmetric) Earth is fixed.

If the projectile's control surfaces were to cease functioning at the time instant $t_0$, there would exist a velocity $V_d$ such that, if the projectile had this velocity in N at the time instant $t_0$, it would strike at a specified time $t_1$ after moving in free fall in an elliptic trajectory C solely under the action of the Earth's gravitational field.

$V_d$ is known as the deficit velocity of the projectile in N at time $t_0$. The velocity $V_c$ that must be added to $V_m$ to obtain $V_d$ is called the correction velocity ($\Delta V$). One aspect provided by this projected deficit guidance algorithm is to drive the projectile's correction velocity to zero as the flight progresses, so that at the instant the control surfaces are locked, the projectile velocity is equal to the deficit velocity. This facilitates or ensures that the projectile strikes the target point $P_1$.

Figure 8:
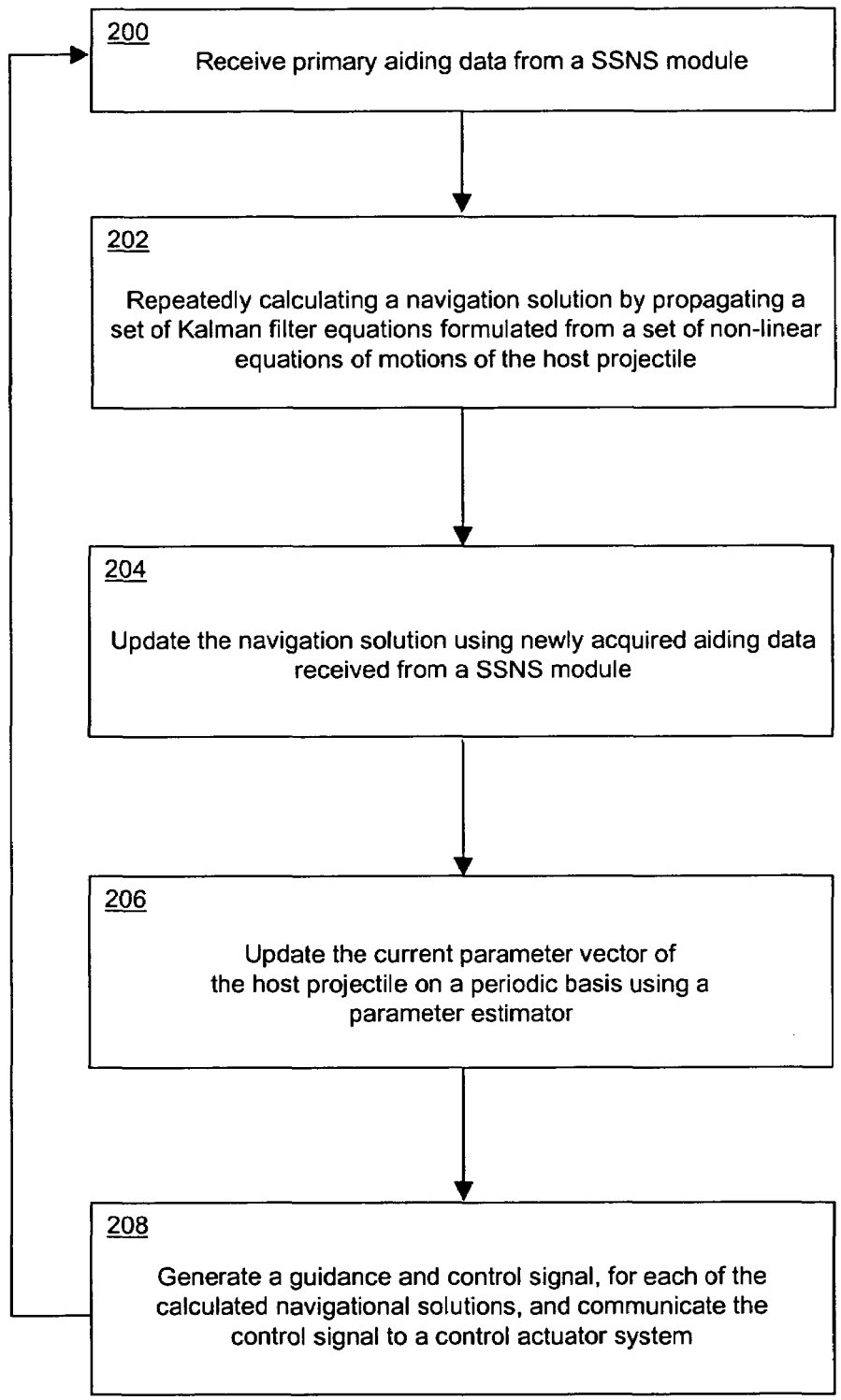
FIG. 8 is a flowchart showing exemplary operations for a NG&C system navigating a thrusted or non-thrusted host projectile utilizing a SSNS module in accordance with the invention.

FIG. 8 is a flowchart showing exemplary operations for navigating a thrusted or non-thrusted projectile in accordance with some embodiments of the invention and will be described with reference to some of the system components depicted in FIGS. 2, 3, and 5.

As indicated in block 200, adaptive navigation module 70 receives aiding data from SSNS module 61. In one particular implementation, this may be accomplished by SSNA processor 63 communicating aiding data to navigation processor 72 and system identification unit 74.

Next, a state or navigation solution of the host projectile may be estimated using, for example, a set of non-linear equations of motions of the host projectile formulated as a set of Kalman filter equations (block 202). One method of using Kalman filter algorithms for calculating such estimations is depicted in FIG. 5. If desired, the set of non-linear equations may be solved using its linearization around a nominal trajectory and converting the set of non-linear equations of motion into a set of linearized equations of motions that is solvable by a standard Kalman filter method.

In block 204, the states, or the navigation solution, of the host projectile may be updated using, for example, navigation processor 72. The navigation processor typically performs this updating function using the aiding data received from SSNA processor 63. The aiding data is generally communicated to navigation processor 72 at a medium rate.

In another operation, the parameter vector of the host projectile may be estimated and updated using parameter estimator 88 (block 206). This estimating and updating may be performed at a slow clock rate on a continuous or periodic basis. In some implementations, the parameter estimator estimates a parameter vector of the host projectile. The estimated parameter vector enables in-flight corrections of an initially predicted parameter vector. This permits the appropriate correction of the ballistic trajectory of the host projectile, and ensures that a particular or desired target (aimpoint) is achieved. If desired, a weighted least-squares fit operation may be used to estimate the parameter vector of the host projectile As indicated in block 208, a guidance and control signal may be generated and subsequently communicated to the appropriate control actuator system permitting real time navigation and guidance of a host projectile. Typically, the guidance and control signals are generated by external guidance and control processor 76.

Figure 9:
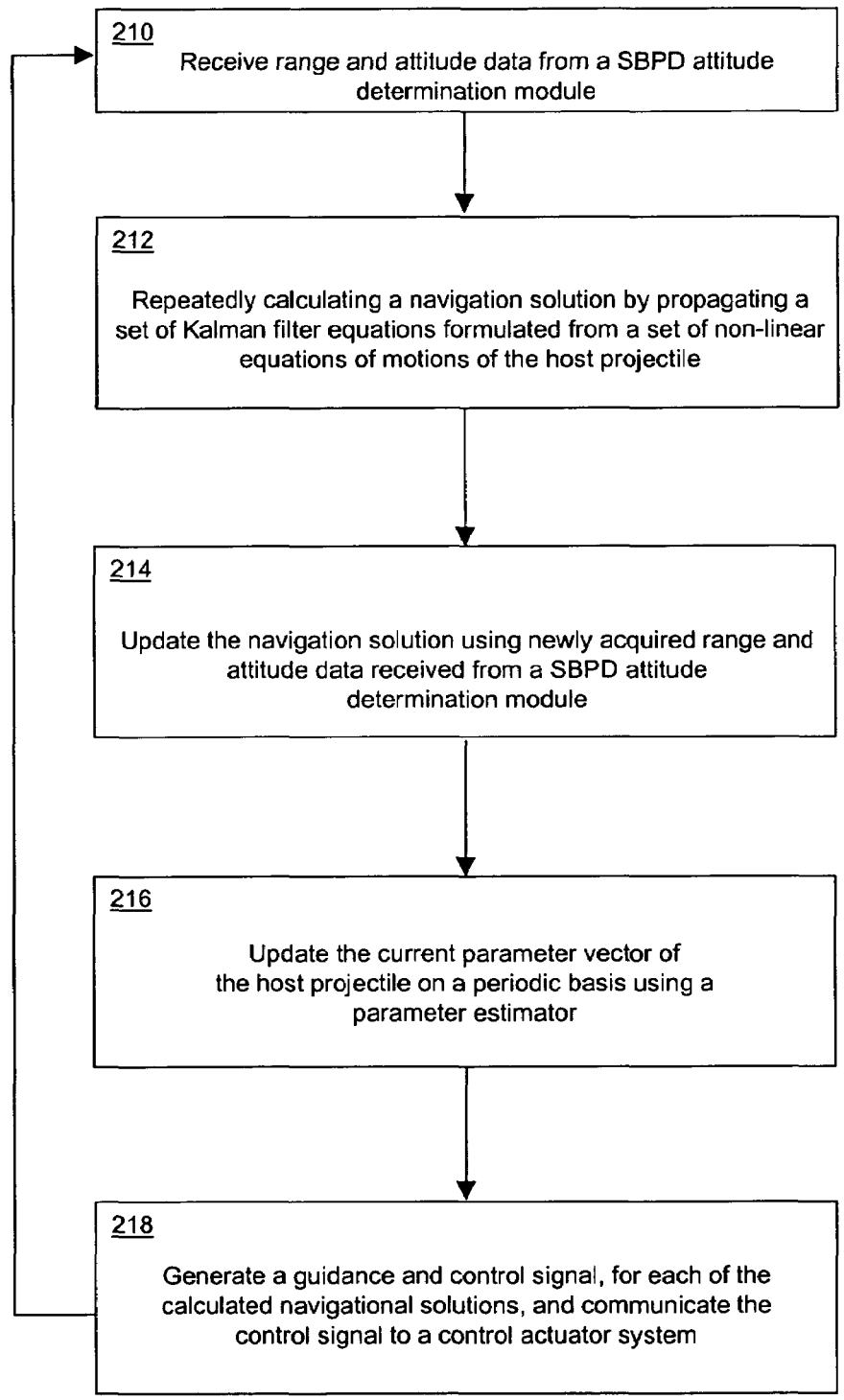
FIG. 9 is a flowchart showing exemplary operations for a NG&C system navigating a thrusted or non-thrusted host projectile utilizing a SBPD attitude determination module in accordance with the invention.

FIG. 9 is a flowchart showing exemplary operations for navigating a thrusted or non-thrusted projectile in accordance with some embodiments of the invention and will also be described with reference to some of the system components depicted in FIGS. 4 and 5.

As indicated in block 210, adaptive navigation module 70 may receive range and attitude data from SBPD attitude determination module 62. In one particular implementation, this may be accomplished by SBPD sensor 64 communicating range and attitude data to navigation processor 72 and system identification unit 74.

Next, a state or navigation solution of the host projectile may be estimated using, for example, a set of non-linear equations of motions of the host projectile formulated as a set of Kalman filter equations (block 212). One method of using Kalman filter algorithms for calculating such estimations is depicted in FIG. 5. If desired, the set of non-linear equations may be solved using its linearization around a nominal trajectory and converting the set of non-linear equations of motion into a set of linearized equations of motions that is solvable by a standard Kalman filter method.

In block 214, the states, or the navigation solution, of the host projectile may be updated using, for example, navigation processor 72. The navigation processor typically performs this updating function using the range and attitude data received from SBPD processor 64. The range and attitude data is generally communicated to navigation processor 72 at a medium rate. The parameter vector estimating and updating of block 216, and the guidance control signal generation of block 218 may be performed in a manner similar to the operations shown in blocks 206 and 208, respectively, of FIG. 8.

Although various embodiments of the invention may be implemented using the exemplary series of operations shown in this figure, those skilled in the art will realize many variations are possible. For example, the estimating operation of block 212 may further include performing a linearization of the set of non-linear equations of motion of the projectile around a nominal trajectory and converting the set of non-linear equations of motion into a set of linearized equations of motion that is solvable by a standard Kalman filter method.

In addition, the estimating operation depicted in block 216 may further include updating in real time an estimated set of external and internal parameters of the host projectile. This further enhances the ability to provide in-flight corrections to the initial trajectory of the host projectile. Another variation may be where the just described updating operation further includes estimating the parameter vector using a weighted least-squares fit operation.

In other implementations, the generating operation of block 218 may also include an optimal guidance law, which is a combined estimator-controller based on the separation principle. In this case, block 84 is the estimator and block 76 plays the role of the controller in the above principle.

Another variation of the generating operation of block 218 may include predicting an impact point using either a null miss predictive proportional navigation (PPN) or a homing predictive proportional navigation (HPPN) guidance algorithm. In this aspect, a control command may be generated and communicated to the canards and/or fins of the projectile by comparing a predicted impact point with the aimpoint. Still other possibilities may include any one of the following methods: profile steering, vector steering and proportional navigation (PN), curvilinear steering, and midcourse divert steering. Another alternative may include calculating the correction velocity $\Delta V$ required to navigate the projectile to the aimpoint by applying a projected deficit velocity algorithm to the projectile velocity. In this aspect, correction velocity $\Delta V$ may be generated by aerodynamic forces and moments on control surfaces of the host projectiles, and/or the reaction force of the projectile.

Still other possibilities include modifying the updating operation of block 214. For example, this operation may further include obtaining a set of range and attitude data from the SBPD attitude determination receiver at a medium rate, and then using the measurement model to convert the range and attitude data into a 6 DOF solution. Then, after performing a reasonableness test, the suitable data may be used to update the Kalman filter, and to propagate the Kalman filter to obtain a high rate navigation solution that may be transferred to the parameter estimator. The high rate navigational solution may also be used to provide a feedback signal to the measurement model.

Other possibilities for accomplishing the updating operation of block 216 include storing the high rate navigational solution in the parameter estimator, and then updating parameters of the navigational solution at a slow clock rate. Next, the updated parameters may be transferred to the state estimator to update the coefficients of the extended Kalman filter using, for example, a slow clock rate. The coefficients of the IGCM may be used to generate a trial trajectory since the IGCM is typically updated with a trial parameter vector generated by the parameter estimator. Note, the parameter estimator may generate a set of trial parameter vectors using perturbations from the search value of the parameter vector calculated by the optimization algorithm. Lastly, an optimization algorithm may be used to select the optimal parameter vector among a set of trial parameter vectors.

If desired, operation 216 may be accomplished by first generating a set of trial parameter vectors to calculate a set of trial trajectories. Then, a set of performance indexes may be calculated by comparing a trial trajectory to the measured trajectory constructed from the high clock rate navigation solution received and stored from the state estimator. Then, a search for an optimal parameter vector that minimizes the performance index may be performed.

Figure 10:
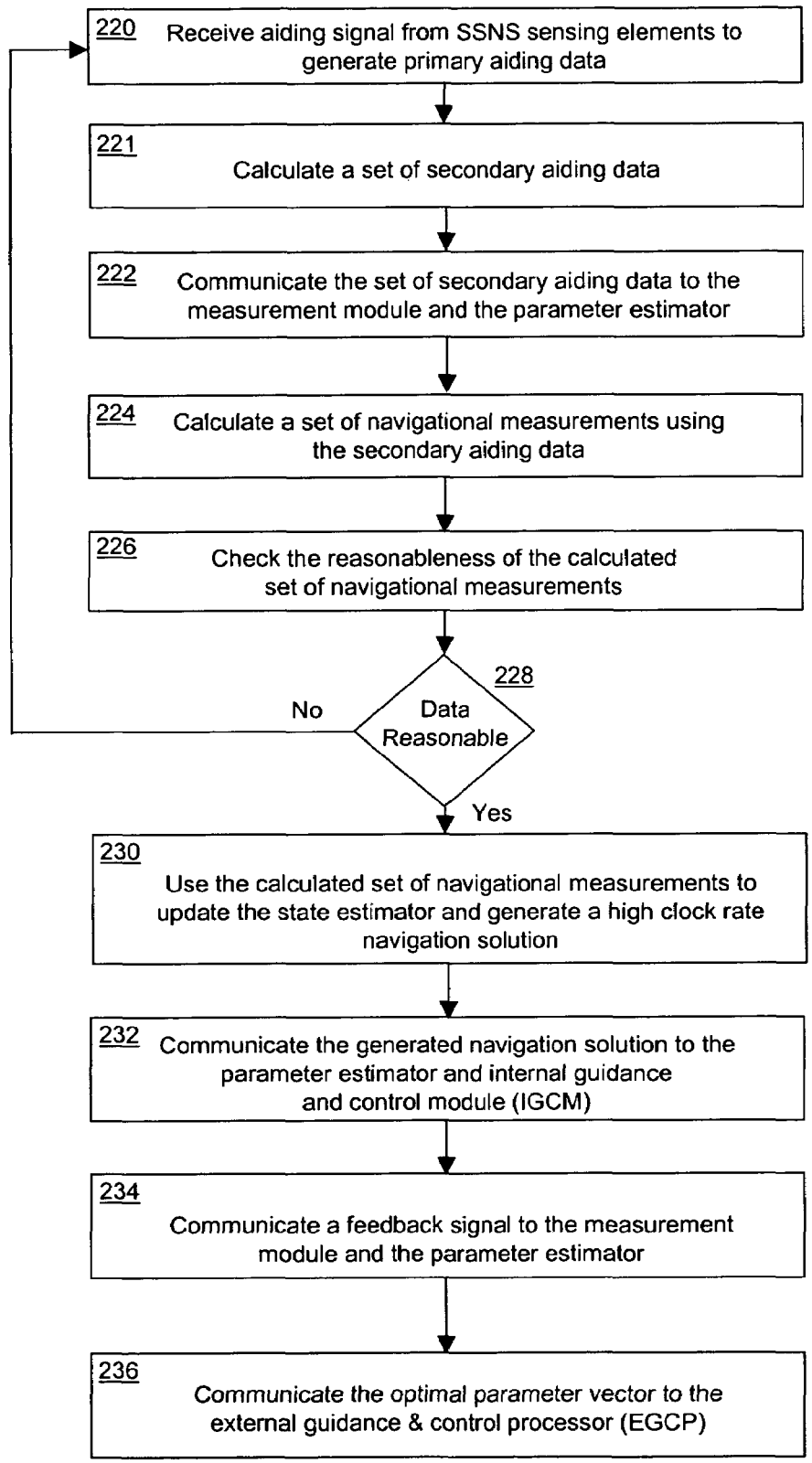
FIG. 10 is a flowchart showing exemplary operations for an adaptive navigation module navigating a thrusted or non-thrusted host projectile utilizing a SSNS module in accordance with the invention.

FIGS. 10 and 11 are similar flowcharts showing exemplary operations for navigating a thrusted or non-thrusted projectile in accordance with some embodiments of the invention and will also be described with reference to some of the system components depicted in FIGS. 2–5.

Referring first to FIG. 10, as indicated in block 220, SSNA processor 63 may receive an aiding signal from one or more SSNS sensing elements such as: SSNA antennas 42, SSNA transducers 44, fiber optic sensing coils 46, magnetic sensing elements 46, master optical sensor 51, slave optical sensors 53, optical sun sensor 55, and optical star sensor 57. The SSNA processor may then utilize this aiding signal to generate primary aiding data, which is communicated to sensor scheduler unit 65. Next, the sensor scheduler unit may utilize the primary aiding data to calculate a secondary set of aiding data for the SSNA processor (block 221). If desired, such set of secondary aiding data may be synchronized to facilitate a simultaneous updating.

In block 222, SSNS module 61 communicates the set of secondary aiding data to adaptive navigation module 70. In one particular implementation, this may be accomplished by SSNA processor 63 communicating the secondary aiding data to measurement module 82, a component of the navigation processor 72, and parameter estimator 88, a component of the system identification unit 74 (FIG. 5). Communication of the set of secondary aiding data may be accomplished using a medium clock rate.

In block 224, a set of navigational measurements may be calculated using the secondary aiding data. This calculation may be performed using, for example, measurement module 82.

In another operation, the suitability or reasonableness of the calculated set of navigational measurements may be checked or assessed (block 226). As depicted in decision block 228, if the set of navigational measurements is deemed unreasonable, then the data may be rejected and control may flow back to block 220 where new aiding signals may be received by SSNA processor 63. Alternatively or additionally, a data recovery procedure, using data recovery unit 80, may also be performed.

Referring still to block 228, if the set of navigational measurements satisfy some acceptance criteria, then the data may be accepted and control may flow to block 230.

In block 230, the set of navigational measurements may be communicated to state estimator 84 where this data may be used to update and propagate through a Kalman filter, for example, thus generating a high clock rate navigation solution.

In another operation, state estimator 84 may communicate the generated navigation solution to parameter estimator 88 and IGCM 90 (block 232). The state estimator typically uses a high clock rate during this communication.

As indicated in block 234, parameter estimator 88 may communicate a feedback signal to navigation processor 72, and in particular, to measurement module 82 and state estimator 84. In these communications, state estimator 84 typically implements a slow clock rate. One aspect of the feedback signal feature provides an update to measurement module 82 whenever changes are detected in the parameter vector of the host projectile.

In block 236, an optimal parameter vector may be generated by IGCM 90, and then communicated to EGCP 76. The optimal parameter vector, along with target information, may be used to generate commands that can be communicated to the appropriate control actuator system, thus permitting navigational control of the host projectile. It is to be understood that the operations depicted in FIGS. 10 and 11 may be repeated on a continuous or periodic basis to provide real time navigation of the host projectile.

FIG. 11 is a flowchart showing exemplary operations for navigating a thrusted or non-thrusted projectile in accordance with some embodiments of the invention that use a SBPD system and will also be described with reference to some of the system components depicted in FIGS. 4 and 5.

As indicated in block 237 of FIG. 11, SBPD sensor 64 may receive antenna signal data from master and slave antennas 52 and 54. The SBPD sensor may then use this antenna signal data to generate and communicate phase and Doppler data to attitude determination unit 66. Next, the attitude determination unit may calculate the attitude of the host projectile using the phase and Doppler data (block 238).

In block 239, attitude determination module 62 communicates the range and attitude data to adaptive navigation module 70. In one particular implementation, this may be accomplished by SBPD sensor 64 communicating the range and attitude data to measurement module 82 and parameter estimator 88 (FIG. 5). Communication of range and attitude data may be accomplished using a medium clock rate.

In block 240, a 6 DOF solution may be calculated using the range and attitude data. This calculation may be performed using, for example, measurement module 82.

In another operation, the suitability or reasonableness of the calculated 6 DOF solution data may be checked or assessed (block 241). As depicted in decision block 228, if the 6 DOF solution data is deemed unreasonable, then the data may be rejected and control may flow back to block 237 where new range data may be received by SBPD sensor 64. Alternatively or additionally, a data recovery procedure, using data recovery unit 80, may also be performed. On the other hand, if the 6 DOF solution data satisfies some acceptance criteria, then the data may be accepted and control may flow to block 243.

In block 243, the 6 DOF solution may be communicated to state estimator 84 where this data may be used to update and propagate through a Kalman filter, thus generating a high clock rate navigation solution. Further processing may proceed in a manner similar to that depicted in blocks 232, 234, and 236 of FIG. 10

FIG. 12 is a flowchart showing exemplary operations for real time updating of the host projectile parameter vector in accordance with some embodiments of the invention. This figure will also be described with reference to various system components depicted in FIGS. 2–5.

As shown in block 250, parameter estimator 88 receives, at a high clock rate, a navigation solution from state estimator 84, as well as the current control surface deflections of the host projectile from the EGCP 76. Control surface deflections denotes the degree of the flaps configured with the host projectile, relative to a neutral position. If desired, the navigation solution and current control surface deflection data may be stored for later use.

Next, at appropriate times, parameter estimator 88 receives and stores medium clock rate calculated set of navigational measurements obtained from SSNS module 61 (block 252). Data obtained in operations 250 and 252 is typically collected during a time period defined by a slow clock cycle. Upon the completion of this data collection cycle, parameter estimator 88 may initiate a parameter estimation cycle by initializing the optimization procedure (block 254).

As depicted in block 256, parameter estimator 88 may generate a set of trial parameter vectors using perturbations of a current value of the search parameter vector (which had been calculated after either the previous slow clock cycle or the previous optimization cycle). Next, IGCM 90 may generate a set of trial trajectories using the just-generated set of trial parameter vectors. Parameter estimator 88 may then calculate a set of performance indexes by comparing the set of generated trial trajectories with the corresponding measured trajectory formed by the high clock rate navigation solution of the host projectile (block 258).

In block 260, a search for an optimal parameter vector that minimizes the performance index may be performed using, for example, an optimization algorithm. If the performance index is above some predetermined level, control may flow back to block 256 so that another set of trial parameter vectors may be obtained. On the other hand, if the performance index meets or exceeds some acceptable threshold, control may flow to block 262. Optimization algorithms are well known in the art and therefore will not be further described.

As shown in block 262, a global copy of the current parameter vector may be updated with the generated optimal parameter vector. Updating may be accomplished by communicating the optimal parameter vector to measurement module 82, state estimator 84, IGCM 90, and EGCP 76. IGCM 90 may utilize the updated parameter vector to generate a nominal trajectory for use by the state estimator during the next slow clock cycle.

Real time navigation control of a host projectile proceeds as follows (block 264). IGCM 90 may communicate to EGCP 76 the necessary data including current trajectory, nominal trajectory, and aimpoint. The EGCP 76 may utilize this data to generate a set of control commands, which are communicated to control actuator system 78, thus providing navigation of the host projectile. During the stabilization phase, the EGCP may monitor the real time navigation solution and may take precautionary measures to limit excessive transient responses.

At this stage of operation, control may flow back to block 250 where parameter estimator 88 may again receive aiding data from SSNS module 61, as well as the high clock rate navigation solution from state estimator 84. The series of operations depicted in these figures may be repeated on a continuous or periodic basis to achieve real time navigation of the host projectile.

Although various embodiments of the invention may be implemented using the exemplary series of operations shown in FIGS. 8–12, those of ordinary skill in the art will realize that additional or fewer operations may be performed. Moreover, it is to be understood that the order of operations shown in these figures is merely exemplary and that no single order of operation is required or desired. For example, as an alternative to receiving measurement from the SSNS module in block 252, parameter estimator 88 may be implemented to receive and store medium clock rate range and attitude data obtained from SBPD attitude determination module 62.

While the invention has been described in detail with reference to disclosed embodiments, various modifications within the scope and spirit of the invention will be apparent to those of working skill in this technological field. It is to be appreciated that features described with respect to one embodiment typically may be applied to other embodiments. Therefore, the invention properly is to be construed with reference to the claims.

What is claimed is:

1. A projectile navigation, guidance, and control method comprising:

(a) repeatedly calculating position and attitude of a navigation solution for a host projectile using a state estimator, wherein said calculating utilizes a current parameter vector of said host projectile and previously calculated position and attitude of said navigation solution;

(b) receiving primary aiding data from a solid state navigational sensor (SSNS) module comprising at least one solid state navigational sensor;

(c) updating said position and attitude of said navigation solution based upon newly received primary aiding data received from said SSNS module; and (d) communicating each of said repeatedly calculated navigation solutions to an external guidance and control processor adapted to provide real time navigation of said host projectile based upon said navigation solution.

2. The method according to claim 1, wherein said state estimator comprises a
Bayesian state estimator.

3. The method according to claim 1, wherein said state estimator comprises a set of Kalman filters.

4. The method according to claim 1, wherein said state estimator comprises a set of extended Kalman filters.

5. The method according to claim 1, wherein said at least one solid state navigational sensor comprises an optical imaging sensor.

6. The method according to claim 1, wherein said at least one solid state navigational sensor comprises a non-imaging sensor.

7. The method according to claim 1, wherein said at least one solid state navigational sensor comprises a satellite based position-determining (SBPD) sensor.

8. The method according to claim 1, wherein said at least one solid state navigational sensor is selected from a group of optical imaging sensors consisting of an infrared sensor, visible light camera, sun sensor, and a star sensor.

9. The method according to claim 1, wherein said at least one solid state navigational sensor is selected from a group of non-imaging sensors consisting of a fiber optic gyroscope (FOG), magnetic field sensor, and a barometric pressure sensor.

10. The method according to claim 1, wherein said at least one solid state navigational sensor is selected from a group of satellite based position-determining (SBPD) sensors consisting of a global positioning system (GPS), global orbiting navigation system (GLONASS), and a Galileo navigation system.

11. The method according to claim 1, wherein said solid state navigational sensor (SSNS) module comprises a plurality of solid state navigational sensors.

12. The method according to claim 1, wherein said solid state navigational sensor (SSNS) module comprises at least one optical imaging sensor and at least one non-imaging sensor.

13. The method according to claim 1, wherein said solid state navigational sensor (SSNS) module comprises at least one optical imaging sensor and at least one satellite based position-determining (SBPD) sensor.

14. The method according to claim 1, wherein said solid state navigational sensor (SSNS) module comprises a plurality of solid state sensors, wherein said updating operation (c) further comprises:

(c-1) serially updating said position and attitude parameters of said navigation solution based upon newly received primary aiding data received from said SSNS module.

15. The method according to claim 1, wherein said solid state navigational sensor (SSNS) module comprises a plurality of solid state sensors, wherein said updating operation (c) further comprises:

(c-1) synchronizing signal output from each of said plurality of solid state navigational sensors and then updating said position and attitude of said navigation solution based upon newly received and synchronized primary aiding data received from said SSNS module.

16. The method according to claim 1, said method further comprising:
steering said host projectile to an intended target based upon said repeatedly calculated navigation solutions.

17. The method according to claim 1, wherein said position and attitude parameters of said navigation solution is calculated on a substantially continuous basis, and said updating operation (c) is performed on a periodic basis.

18. The method according to claim 1, wherein said state estimator comprises a set of Kalman filters, said calculating operation (a) further comprising:

(a-1) performing a linearization of a set of non-linear equations of motions of said host projectile around a nominal trajectory and converting said set of non-linear equations of motion into a set of linearized equations of motions that is solvable by said set of Kalman filter.

19. The method according to claim 1, wherein said updating operation (c) further comprises:

(c-1) updating in real time said current parameter vector of said host projectile to provide in-flight corrections to initial conditions of an initially predicted trajectory of said host projectile.

20. The method according to claim 19, said method further comprising:
estimating a new parameter vector using a parameter estimator comprising of a stabilization phase, a data collection phase, and a parameter estimation phase; and
updating said current parameter vector with said new parameter vector.

21. The method according to claim 1, said method further comprising:
predicting an impact point of said host projectile using a null miss predictive proportional navigation (PPN) guidance algorithm; and
generating a control command that is communicated to the canards and/or fins of said host projectile, wherein said control command is generated by comparing said predicted impact point with an aimpoint.

22. The method according to claim 1, said method further comprising:
calculating correction velocity, $\Delta V$, required to navigate said host projectile to an aimpoint by applying a projected deficit velocity algorithm to projectile velocity, wherein said correction velocity, $\Delta V$, is generated by aerodynamic forces on control surfaces of said host projectile.

23. The method according to claim 1, wherein said at least one solid state navigational sensor includes a multi-turn, fiber-optic coil adapted to provide two counter rotating, optical waves travelling in opposite directions through said multi-turn fiber-optic coil, wherein a phase difference between said two counter rotating, optical waves is used to calculate and update said attitude of said navigation solution.

24. The method according to claim 1, wherein said navigation solution further includes an altitude parameter, wherein said at least one solid state navigational sensor includes a barometric pressure transducer adapted to provide barometric pressure information, wherein said barometric pressure information is used to calculate and update altitude of said navigation solution.

25. The method according to claim 1, wherein said at least one solid state navigational sensor includes a magnetic field sensor adapted to provide a reference axis of said host projectile, wherein an angle between said reference axis and the local earth magnetic field vector is used to calculate and update a heading parameter of said navigation solution.

26. The method according to claim 1, wherein said at least one solid state navigational sensor includes a magnetometer sensor adapted to provide a magnetic field strength around said host projectile, wherein said magnetic field strength is compared to a pre-stored map of the local magnetic field strength to determine and update said position of said navigation solution.

27. The method according to claim 1, wherein said at least one solid state navigational sensor includes a sun sensor adapted to provide relative attitude angles of said host projectile and a solar disk using a position of a patch of sunlight passing through an entrance aperture of said sun sensor, wherein said relative attitude angles is used to calculate and update said attitude of said navigation solution.

28. The method according to claim 1, wherein said at least one solid state navigational sensor includes a star sensor adapted to provide a magnitude of brightness of one or more stars collected on a focal plane of said star sensor, wherein said magnitude of brightness is compared to a pre-stored star catalog to identify which particular star has been sighted, wherein an attitude angle of said host projectile is calculated based upon said star identification, and wherein said attitude angle is used to update said attitude of said navigation solution.

29. The method according to claim 1, wherein said at least one solid state navigational sensor includes infrared and visible light sensors adapted to provide images of nearby terrain, wherein received images of said terrain are compared to a pre-stored terrain map to determine a position of said host projectile, wherein said position of said host projectile is used to update said position of said navigation solution.

30. The method according to claim 1, wherein said navigation solution further comprises velocity of said host projectile, and wherein said calculating operation (a) further comprises repeatedly calculating said velocity of said navigation solution using said state estimator, wherein said calculating utilizes said current parameter vector of said host projectile and previously calculated position, velocity, and attitude of said navigation solution.

31. The method according to claim 30, wherein position and velocity of said host projectile is determined by at least one ground-based radar unit, wherein said position and velocity is uploaded to said host projectile and used to update said position and velocity of said navigation solution.

32. The method according to claim 1, wherein said host projectile is a non-thrusted flight vehicle.

33. The method according to claim 1, wherein said host projectile is a thrusted flight vehicle.

34. The method according to claim 1, wherein said calculating operation (a) further comprises:
utilizing body dynamics of said host projectile in addition to said primary aiding data to measure incremental changes in velocity and rotation angles of said host projectile.

35. The method according to claim 1, wherein said updating operation (c) further comprises:

(c-1) obtaining said primary aiding data from said solid state navigational sensor (SSNS) module at a medium clock rate;
(c-2) using a measurement model to convert said primary aiding data into a set of navigational measurements;
(c-3) performing a reasonableness test on said set of navigational measurements to find a suitable set of said navigational measurements;
(c-4) obtaining a high clock rate navigation solution by updating and propagating said state estimator with said suitable set of navigational measurements;
(c-5) transferring said high clock rate navigational solution to said parameter estimator and to an internal guidance and control module (IGCM); and
(c-6) providing said high clock rate navigational solution to said measurement model as a feedback signal.

36. The method according to claim 1, wherein said updating operation (c) further comprises:

(c-1) obtaining said primary aiding data from said solid state navigational sensor (SSNS) module at a medium clock rate;
(c-2) using a measurement model to convert said primary aiding data into a 6 degrees of freedom (DOF) solution;
(c-3) performing a reasonableness test on said 6 DOF solution to find a suitable 6 DOF solution;
(c-4) obtaining a high clock rate navigation solution by updating and propagating said state estimator with said suitable 6 DOF solution;
(c-5) transferring said high clock rate navigational solution to said parameter estimator and to an internal guidance and control module (IGCM); and
(c-6) providing said high clock rate navigational solution to said measurement model as a feedback signal.

37. The method according to claim 1, wherein said communicating operation (d) further comprises:

(d-1) receiving said high clock rate navigation solution from said state estimator;
(d-2) receiving current control surface deflections data from an external guidance and control processor (EGCP);
(d-3) receiving said medium clock rate primary aiding data from said solid-state navigation system (SSNS) module;
(d-4) initializing an optimization procedure for determining an optimized performance index;
(d-5) generating an optimal parameter vector of said host projectile using data obtained in operations (d-1), (d-2), (d-3), and (d-4);
(d-6) updating said current parameter vector with said optimal parameter vector;
(d-7) communicating said current parameter vector to said state estimator, said measurement module, and said internal guidance and control module (IGCM); and
(d-8) generating an optimal trajectory to be used as a nominal trajectory by said state estimator using said current parameter vector.

38. The method according to claim 37, wherein said generating operation (d-5) further comprises:

(d-5-1) generating a set of trial parameter vectors using perturbations of said parameter vector calculated by said optimization procedure;
(d-5-2) generating a set of trial trajectories using said set of trial parameter vectors;
(d-5-3) calculating a set of performance indexes by comparing said set of trial trajectories with a measured trajectory formed by said navigation solution; and (d-5-4) searching and identifying an optimum parameter vector that minimizes said performance index.

39. A projectile navigation, guidance, and control system comprising:
- a state estimator adapted to repeatedly calculate position and attitude of a navigation solution for a host projectile utilizing a current parameter vector of said host projectile and previously calculated position and attitude of said navigation solution;
- a solid state navigational sensor (SSNS) module adapted to provide primary aiding data in response to signals received from at least one solid state navigational sensor configured with said SSNS module, wherein said position and attitude of said navigation solution are updated based upon newly received primary aiding data received from said SSNS module; and
- an external guidance and control processor adapted to generate a guidance and control signal based upon each of said calculated navigation solutions, wherein said guidance and control signal is adapted to provide real time navigation of said host projectile.

40. The system according to claim 39, wherein said state estimator comprises a Bayesian state estimator.

41. The system according to claim 39, wherein said state estimator comprises a set of Kalman filters.

42. The system according to claim 39, wherein said state estimator comprises a set of extended Kalman filters.

43. The system according to claim 39, wherein said at least one solid state navigational sensor comprises an optical imaging sensor.

44. The system according to claim 39, wherein said at least one solid state navigational sensor comprises a non-imaging sensor.

45. The system according to claim 39, wherein said at least one solid state navigational sensor comprises a satellite based position-determining (SBPD) sensor.

46. The system according to claim 39, wherein said solid state navigational sensor (SSNS) module comprises a plurality of solid state navigational sensors.

47. The system according to claim 39, wherein said solid state navigational sensor (SSNS) module comprises at least one at least one non-imaging sensor and at least one satellite based position-determining (SBPD) sensor.

48. The system according to claim 39, wherein said at least one solid state navigational sensor includes a multi-turn, fiber-optic coil adapted to provide two counter rotating, optical waves travelling in opposite directions through said multi-turn fiber-optic coil, wherein a phase difference between said two counter rotating, optical waves is used to calculate and update said attitude of said navigation solution.

49. The system according to claim 39, wherein said navigation solution further includes an altitude parameter, and wherein said at least one solid state navigational sensor includes a barometric pressure transducer adapted to provide barometric pressure information, wherein said barometric pressure information is used to calculate and update altitude of said navigation solution.

50. The system according to claim 39, wherein said at least one solid state navigational sensor includes a magnetic field sensor adapted to provide a reference axis of said host projectile, wherein an angle between said reference axis and the local earth magnetic field vector is used to calculate and update a heading parameter of said navigation solution.

51. The system according to claim 39, wherein said at least one solid state navigational sensor includes a magnetometer sensor adapted to provide a magnetic field strength around said host projectile, wherein said magnetic field strength is compared to a pre-stored map of the local magnetic field strength to determine and update said position said navigation solution.

52. The system according to claim 39, wherein said at least one solid state navigational sensor includes a sun sensor adapted to provide relative attitude angles of said host projectile and a solar disk using a position of a patch of sunlight passing through an entrance aperture of said sun sensor, wherein said relative attitude angles is used to calculate and update said attitude of said navigation solution.

53. The system according to claim 39, wherein said at least one solid state navigational sensor includes a star sensor adapted to provide a magnitude of brightness of one or more stars collected on a focal plane of said star sensor, wherein said magnitude of brightness is compared to a pre-stored star catalog to identify which particular star has been sighted, wherein an attitude angle of said host projectile is calculated based upon said star identification, and wherein said attitude angle is used to update said attitude of said navigation solution.

54. The system according to claim 39, wherein said at least one solid state navigational sensor includes infrared and visible light sensors adapted to provide images of nearby terrain, wherein received images of said terrain are compared to a pre-stored terrain map to determine a position of said host projectile, wherein said position of said host projectile is used to update said position of said navigation solution.

55. The system according to claim 39, wherein said navigation solution further comprises velocity of said host projectile, and wherein said calculating operation further comprises repeatedly calculating said velocity of said navigation solution using said state estimator, wherein said calculating utilizes said current parameter vector of said host projectile and previously calculated position, velocity, and attitude of said navigation solution.

56. The system according to claim 55, wherein position and velocity of said host projectile is determined by at least one ground-based radar unit, wherein said position and velocity is uploaded to said host projectile and used to update said position and velocity of said navigation solution.

57. The system according to claim 39, wherein said host projectile is a non-thrusted flight vehicle.

58. The system according to claim 39, wherein said host projectile is a thrusted flight vehicle.

* * * * *